US012300176B2

(12) United States Patent
Kubota et al.

(10) Patent No.: US 12,300,176 B2
(45) Date of Patent: May 13, 2025

(54) DISPLAY DEVICE AND ELECTRONIC APPARATUS

(71) Applicant: SEIKO EPSON CORPORATION, Tokyo (JP)

(72) Inventors: Takehiko Kubota, Matsumoto (JP); Hitoshi Ota, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/395,848

(22) Filed: Dec. 26, 2023

(65) Prior Publication Data

US 2024/0212614 A1 Jun. 27, 2024

(30) Foreign Application Priority Data

Dec. 27, 2022 (JP) ................................ 2022-209725

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2330/021* (2013.01)

(58) Field of Classification Search
CPC ..................... G09G 3/3233; G09G 2300/0819
See application file for complete search history.

(56) References Cited

U.S. PATENT DOCUMENTS

2006/0262050 A1 11/2006 Ogawa et al.
2011/0084993 A1 4/2011 Kawabe
2011/0279049 A1 11/2011 Kawabe
2012/0113085 A1 5/2012 Kawabe
2012/0280962 A1 11/2012 Kawabe
2013/0120341 A1* 5/2013 Kasai ................... G09G 3/3291 345/211
2014/0176006 A1 6/2014 Kawabe
2016/0042692 A1* 2/2016 Ota ...................... G09G 3/3233 345/215
2017/0125502 A1* 5/2017 Ota ...................... G09G 3/3291
2018/0261155 A1 9/2018 Ota
2019/0279568 A1* 9/2019 Ota ...................... G09G 3/3291
2019/0279572 A1* 9/2019 Ota ...................... G09G 3/3233
2020/0043394 A1* 2/2020 Bai .......................... G09G 3/20
2023/0247880 A1* 8/2023 Kodama .............. G09G 3/3233 257/72

FOREIGN PATENT DOCUMENTS

JP 2006-308861 A 11/2006
JP 2009-223242 A 10/2009
JP 2009-223243 A 10/2009
JP 2010-096990 A 4/2010
JP 2010-249955 A 11/2010
JP 2011-081267 A 4/2011
JP 2018-151506 A 9/2018

* cited by examiner

*Primary Examiner* — William Boddie
*Assistant Examiner* — Bipin Gyawali
(74) *Attorney, Agent, or Firm* — Oliff PLC

(57) ABSTRACT

A display device includes a light-emitting element, a data line, a wiring line, a first constant potential line to which a first constant potential is supplied, a first transistor configured to supply a drive current corresponding to a video signal supplied via the wiring line and the data line to the light-emitting element, a second transistor configured to electrically couple the data line to the first constant potential line, and a switching element configured to electrically couple the data line to the wiring line.

6 Claims, 23 Drawing Sheets

DISPLAY DEVICE AND ELECTRONIC APPARATUS

The present application is based on, and claims priority from JP Application Serial Number 2022-209725, filed Dec. 27, 2022, the disclosure of which is hereby incorporated by reference herein in its entirety.

BACKGROUND

1. Technical Field

The present disclosure relates to a display device and an electronic apparatus.

2. Related Art

Display devices including light-emitting elements such as organic electroluminescence elements are known. An electro-optical device disclosed in JP 2018-151506 A is known as an example of such display devices. The electro-optical device described in JP 2018-151506 A includes a display panel for displaying an image. The display panel is provided with a pixel circuit corresponding to an intersection between a scanning line and a data line. Further, the pixel circuit includes a light-emitting element and a transistor circuit.

The transistor circuit includes a drive transistor and a discharge transistor. The drive transistor supplies a drive current corresponding to a data signal indicating light emission luminance to the light-emitting element. The discharge transistor is on in a horizontal scanning period which is a non-light-emitting period, and electrically couples a power supplying line to which a potential Vorst is applied to an anode of the light-emitting element. When the discharge transistor is on, the anode of the light-emitting element is reset to the potential Vorst. By resetting the light-emitting element to the potential Vorst, a charge remaining at a coupling node between the transistor circuit and the light-emitting element is discharged. Further, in the data line of the display panel, various capacitors such as a capacitance element and a parasitic capacitor are present.

There is a problem in that in the horizontal scanning period including an initialization period in which the anode of the light-emitting element is reset to the potential Vorst, power consumption increases due to charge and discharge of the various capacitors.

SUMMARY

A display device according to a preferred embodiment of the present disclosure in order to solve the above-described problems includes a light-emitting element, a data line, a wiring line, a first constant potential line to which a first constant potential is supplied, a first transistor configured to supply a drive current corresponding to a video signal supplied via the wiring line and the data line to the light-emitting element, a second transistor configured to electrically couple the data line to the first constant potential line, and a switching element configured to electrically couple the data line to the wiring line.

DESCRIPTION OF EMBODIMENTS

Figure 1:
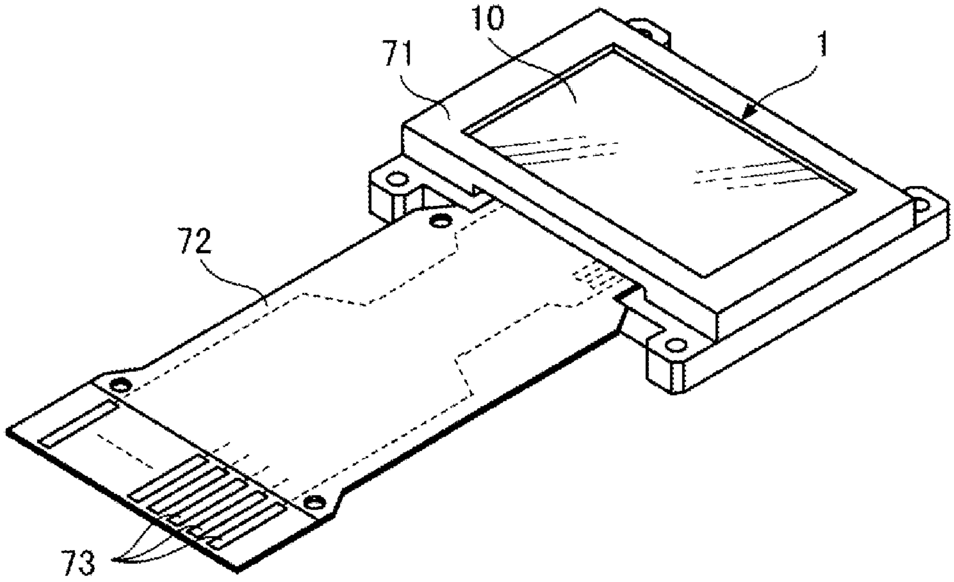
FIG. 1 is a plan view schematically illustrating a display device of a first embodiment.

Preferred embodiments according to the present disclosure are described below with reference to the attached drawings. Note that in the drawings, dimensions and scales of sections differ from actual dimensions and scales as appropriate, and some of the sections are schematically illustrated to make them easily recognizable. The scope of the disclosure is not limited to these forms, unless otherwise stated in the following description to limit the disclosure.

Also, in the present specification, "coupling" means direct or indirect coupling among two or more elements.

A. First Embodiment

1. Basic Configuration of Display Device 1

FIG. 1 is a plan view schematically illustrating a display device 1 of a first embodiment. The display device 1 illustrated in FIG. 1 is, for example, a micro display that displays an image in a head-mounted display. Further, the display device 1 is, for example, an organic EL device including an OLED which is an example of a light-emitting element. OLED is an abbreviation for Organic Light Emitting Diode. EL is an abbreviation of Electroluminescence. In the embodiment, the display device 1 is capable of displaying a full-color image. Note that the images include those only displaying character information. Further, the display device 1 may be a device capable of displaying only a single color.

The display device 1 includes a display unit 10 that displays an image, and is housed in a frame-shaped case 71 opening at the display unit 10. One end of an FPC substrate 72 is coupled to the display device 1. FPC is an abbreviation for Flexible Printed Circuit. A plurality of terminals 73 for coupling a host device, which is not illustrated, are provided at another end of the FPC substrate 72. When the plurality of terminals 73 are coupled to the host device, various signals are supplied from the host device to the display device 1 via the FPC substrate 72.

2. Circuit Configuration of Display Device 1

Figure 2:
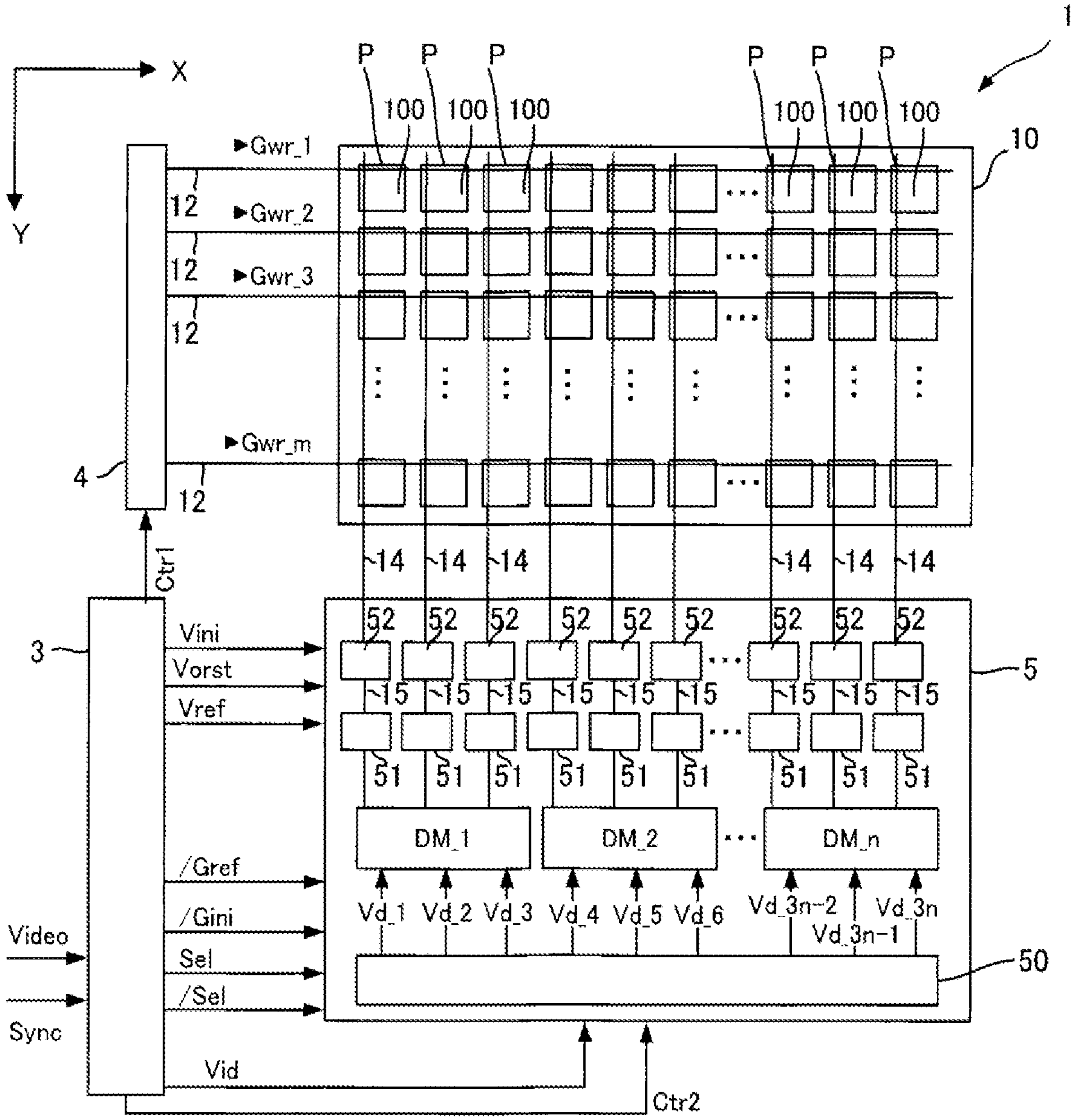
FIG. 2 is a block diagram illustrating a configuration of the display device of the first embodiment.

FIG. 2 is a block diagram illustrating the configuration of the display device 1 of the embodiment. Note that an X-axis and a Y-axis orthogonal to each other are illustrated in FIG. 2. A direction along the X-axis is a "row direction", and a direction along the Y-axis is a "column direction".

As illustrated in FIG. 2, the display device 1 includes, in addition to the display unit 10 described above, a control circuit 3, a scanning line driving circuit 4 and a data line driving circuit 5. The display unit 10, the control circuit 3, the scanning line driving circuit 4 and the data line driving circuit 5 are formed at a semiconductor substrate such as a silicon substrate.

2-1. Display Unit 10

As illustrated in FIG. 2, at the display unit 10, a plurality of pixel circuits 100 are arrayed in a matrix in the row direction and the column direction. The plurality of pixel circuits 100 are provided corresponding to a plurality of pixels P.

The display unit 10 is provided with m rows of scanning lines 12, and 3*n* columns of data lines 14 grouped by three columns. Note that each of m and n is an integer equal to or greater than 2. n represents the number of groups. Each of the m rows of scanning lines 12 is provided along the X-axis, and each of the 3n columns of data lines 14 is provided along the Y-axis. The plurality of pixel circuits 100 are provided corresponding to intersections between the m rows of scanning lines 12 and the 3n columns of data lines 14. The plurality of pixel circuits 100 are provided in a one-to-one manner with respect to the pixels P, and are grouped, for example, by three pixel circuits arranged in the row direction. Accordingly, the pixels P are similarly grouped, for example, by three pixels arranged in the row direction. The grouped three pixels P represent one dot of a pixel forming an image.

2-2. Control Circuit 3

To the control circuit 3 illustrated in FIG. 2, digital video data Video output from the host device (not illustrated) is supplied synchronously with a synchronization signal Sync. The control circuit 3 controls each unit of the display device 1 based on the video data Video and the synchronization signal Sync. The video data Video designates a gray scale level of the pixel P in an image to be displayed by, for example, 8 bits. Further, the synchronization signal Sync is a signal including a vertical synchronization signal that instructs a start of vertical scanning of the video data Video, a horizontal synchronization signal that instructs a start of horizontal scanning, and a dot clock signal.

The control circuit 3 generates a control signal Ctr1 based on the synchronization signal Sync, supplies the control signal Ctr1 to the scanning line driving circuit 4, generates a control signal Ctr2 based on the synchronization signal Sync, and supplies the control signal Ctr2 to the data line driving circuit 5. Each of the control signals Ctr1 and Ctr2 includes a plurality of signals such as a pulse signal, a clock signal and an enable signal.

Further, the control circuit 3 generates image data Vid based on the video data Video, and supplies the image signal Vid to the data line driving circuit 5. TfTThere is a case where luminance characteristics do not match between a gray scale level indicated by the image data Vid and a light-emitting element 150, which will be described later, included in the pixel circuit 100. Thus, to make the light-emitting element 150 emit light at luminance corresponding to the gray scale level indicated by the video data Video, the control circuit 3 generates, for example, the image data Vid by changing 8 bits of the video data Video to 10 bits.

Further, the control circuit 3 generates various control signals based on the synchronization signal Sync, and supplies the various control signals to the data line driving circuit 5. Specifically, the control circuit 3 supplies control signals /Gref, /Gini, Sel, /Sel to the data line driving circuit 5. The control signal /Gref is a control signal of negative logic. The control signal /Gini is a control signal of negative logic. The control signal /Sel has a relationship of logic inversion with the control signal Sel.

Further, the control circuit 3 is supplied with power from a power supply circuit (not illustrated), and supplies a predetermined potential to the data line driving circuit 5. Specifically, the control circuit 3 supplies the potential Vorst, a potential Vref, a potential Vini, and the like to the data line driving circuit 5. In addition, a power supply potential is supplied from the power supply circuit to each pixel circuit 100, the scanning line driving circuit 4 and the data line driving circuit 5 of the display unit 10.

2-3. Scanning Line Driving Circuit 4

As illustrated in FIG. 2, the scanning line driving circuit 4 generates scanning signals /Gwr based on the control signal Ctr1. The scanning signals /Gwr are signals for sequentially selecting and scanning the m rows of scanning lines 12 row by row in each frame period V defined by the vertical synchronization signal. In FIG. 2, the scanning signals /Gwr supplied to the scanning lines 12 in first, second, third, . . . , and m-th rows are respectively denoted by /Gwr_1, /Gwr_2, /Gwr_3, . . . , and /Gwr_m. Note that the frame period V is a period required for the display device 1 to display an image for one cut. A length of the frame period V is, for example, 1/60 seconds when a driving frame rate is 60 Hz. In addition, in the embodiment, the m rows of scanning lines 12 are sequentially selected row by row, but may be sequentially selected a plurality of rows at a time.

Additionally, although not illustrated in FIG. 2, the scanning line driving circuit 4 generates various control signals /Gcmp, /Gorst, /Drst and /Gel described later in addition to the scanning signals /Gwr.

2-4. Data Line Driving Circuit 5

As illustrated in FIG. 2, the data line driving circuit 5 includes a data signal supplying circuit 50, n demultiplexers DM, 3*n* auxiliary circuits 51 and 3*n* initialization circuits 52. In FIG. 2, the n demultiplexers DM are denoted by DM_1, DM_2, . . . , and DM_n, respectively. The 3n auxiliary circuits 51 and the 3n initialization circuits 52 are coupled via 3n wiring lines 15.

The data signal supplying circuit 50 generates video signals Vd based on the image data Vid and the control signal Ctr2. In FIG. 2, the 3n video signals Vd are denoted by Vd_1, Vd_2, Vd_3, Vd_4, Vd_5, Vd_6, . . . , Vd_(3*n*−2), Vd_(3*n*−1) and Vd_3*n*, respectively. The data signal supplying circuit 50 includes, for example, a shift register, a latch circuit, a D/A converter circuit and an amplifier group. The data signal supplying circuit 50 converts the serially supplied image data Vid into parallel in three phases, performs conversion into a gradation potential corresponding to a gray scale level, and outputs a result as the video signals Vd.

Each of the n demultiplexers DM is provided for three columns of the data lines 14 constituting a group. The video signals Vd_1, Vd_2 and Vd_3 are supplied to the demultiplexer DM_1, the video signals Vd_4, Vd_5 and Vd_6 are supplied to the demultiplexer DM_2, and the video signals Vd_(3*n*−2), Vd_(3*n*−1) and Vd_3*n* are supplied to the demultiplexer DM_n. In addition, each of the n demultiplexers DM sequentially supplies the video signals Vd to the three columns of data lines 14 constituting a group.

The 3n auxiliary circuits 51 are provided in a one-to-one manner with respect to the 3n wiring lines 15. Further, the 3n initialization circuits 52 are provided in a one-to-one manner with respect to the 3n data lines 14.

Figure 3:
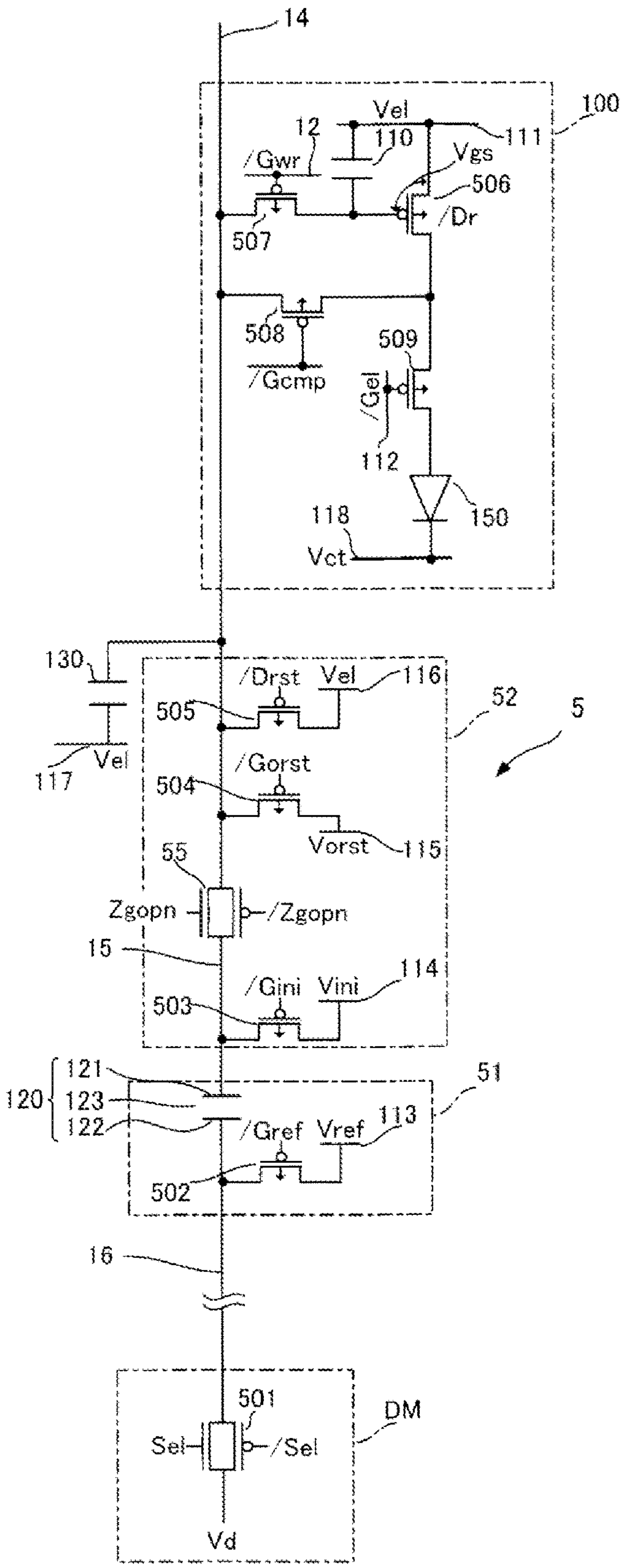
FIG. 3 is a diagram illustrating a configuration example of a pixel circuit and a data line driving circuit illustrated in FIG. 2.

3. Details of Pixel Circuit 100 and Peripheral Circuits Corresponding Thereto FIG. 3 is a diagram illustrating a configuration example of the pixel circuit 100 and the data line driving circuit 5 illustrated in FIG. 2. The plurality of pixel circuits 100 have a similar configuration. Therefore, hereinafter, any one of the plurality of pixel circuits 100 and elements in the data line driving circuit 5 corresponding thereto will be mainly described.

3-1. Pixel Circuit 100

As illustrated in FIG. 3, the pixel circuit 100 includes a first transistor 506, transistors 507, 508, 509, a retention capacitor 110 and the light-emitting element 150. Note that each of the first transistor 506, the transistors 507, 508 and 509 is a P-channel MOS type transistor. MOS is an abbreviation of Metal-Oxide-Semiconductor field effect transistor.

A source of the first transistor 506 is electrically coupled to a power supplying line 111. A potential Vel as a high potential is supplied to the power supplying line 111. The first transistor 506 is a drive transistor that causes a drive current corresponding to a voltage Vgs between a gate and the source to flow to the light-emitting element 150. The first transistor 506 is coupled to the data line 14 via the transistor 507 to be described later. The first transistor 506 supplies a drive current to the light-emitting element 150. The drive current is corresponding to the video signal Vd supplied via the wiring line 15 and the data line 14.

A gate of the transistor 507 is electrically coupled to the scanning line 12. Moreover, one of a source and a drain of the transistor 507 is electrically coupled to the data line 14, and another is electrically coupled to each of the gate of the first transistor 506 and one electrode of the retention capacitor 110. Thus, the transistor 507 controls electrical coupling between the gate of the first transistor 506 and the data line 14. When the transistor 507 is set to on, the potential corresponding to the video signal Vd supplied to the data line 14 is supplied to the gate of the first transistor 506.

One of a source and a drain of the transistor 508 is electrically coupled to the data line 14, and another is electrically coupled to a drain of the first transistor 506. Therefore, the transistor 508 electrically couples the drain included in the first transistor 506 to the data line 14. The control signal /Gcmp is supplied to a gate of the transistor 508. The transistor 508 functions as a threshold compensation transistor that performs threshold potential compensation for causing a potential between the gate and the drain of the first transistor 506 to converge on a threshold potential |Vth|. Note that the threshold potential of the first transistor 506 refers to a potential difference between the gate and the source when a current starts to flow between the source and the drain.

A source of the transistor 509 is electrically coupled to the drain of the first transistor 506, and a drain of the transistor 509 is electrically coupled to an anode of the light-emitting element 150. The transistor 509 functions as a control transistor that controls electrical coupling between the drain of the first transistor 506 and the anode of the light-emitting element 150. Additionally, a gate of the transistor 509 is coupled to a control line 112. The control signal /Gel is supplied to the control line 112.

The light-emitting element 150 has a configuration in which an organic EL layer is interposed between the anode and a cathode. The anode of the light-emitting element 150 is a pixel electrode provided individually for each pixel circuit 100. In contrast, the cathode of the light-emitting element 150 is a common electrode commonly provided across all of the pixel circuits 100, and is coupled to a power supplying line 118. A potential Vct as a fixed potential is supplied to the power supplying line 118.

In the retention capacitor 110, one electrode is electrically coupled to the gate of the first transistor 506, and another electrode is electrically coupled to the power supplying line 111. Thus, the retention capacitor 110 holds a voltage between the gate and the source of the first transistor 506. Note that, as the retention capacitor 110, a parasitic capacitor which is parasitic to the gate of the first transistor 506 may be used, or a capacitance element formed by interposing an insulating layer with mutually different conductive layers in a semiconductor substrate such as a silicon substrate may be used.

Note that the source and the drain of each of the first transistor 506, the transistors 507, 508 and 509 may be replaced with each other in accordance with potential relationships among the first transistor 506, the transistors 507, 508 and 509. Moreover, each of the first transistor 506, the transistors 507, 508 and 509 may be a thin film transistor or may be a field effect transistor.

3-2. Demultiplexer DM

As illustrated in FIG. 3, each of the n demultiplexers DM includes three third transistors 501 corresponding to three columns constituting each group, and sequentially supplies the video signals Vd to the three columns constituting the group. The third transistor 501 is configured by, for example, a transmission gate. Note that in FIG. 3, one third transistor 501 corresponding to one column is illustrated. Additionally, although not illustrated in detail, input terminals of the three third transistors 501 included in each demultiplexer DM are commonly coupled to each other. In addition, an output end of each of the three third transistors 501 is coupled to a second electrode 122 of a capacitance element 120 described below via a second wiring line 16. Each third transistor 501 is on when the control signal Sel is at an H level, and is off when the control signal Sel is at an L level. That is, the third transistor 501 is off when the control signal /Sel is at the H level, and is on when the control signal /Sel is at the L level. Note that the control signal Sel is sequentially and exclusively supplied to each column.

3-3. Auxiliary Circuit 51

As illustrated in FIG. 3, the auxiliary circuit 51 is used for compressing voltage amplitude of the video signal Vd. The auxiliary circuit 51 includes a P-channel MOS-type fifth transistor 502 and the capacitance element 120. A drain of the fifth transistor 502 is coupled to the second wiring line 16, and a source of the fifth transistor 502 is coupled to a third constant potential line 113 that supplies the potential Vref as a "third constant potential". The control signal /Gref is supplied to a gate of the fifth transistor 502.

The capacitance element 120 is provided between the wiring line 15 and the second wiring line 16, and is electrically coupled thereto. The capacitance element 120 functions as a coupling capacitor. The capacitance element 120 includes a first electrode 121, the second electrode 122 and an insulating layer 123. The first electrode 121 is electrically coupled to the wiring line 15. The second electrode 122 is disposed to face the first electrode 121 and is electrically coupled to the second wiring line 16. Thus, the second electrode 122 is electrically coupled to the third transistor 501. The insulating layer 123 is disposed between the first electrode 121 and the second electrode 122. The capacitance element 120 is provided to compress voltage amplitude of the video signal Vd, for example.

3-4. Initialization Circuit 52

As illustrated in FIG. 3, the initialization circuit 52 is used to initialize a predetermined element included in the pixel circuit 100 in an initialization period A described later. The initialization circuit 52 includes a P-channel MOS-type fourth transistor 503, a transistor 504, a transistor 505 and a switching element 55.

The switching element 55 is disposed between the data line 14 and the wiring line 15, and controls electrical coupling between the data line 14 and the wiring line 15. As will be described in detail later, when the switching element 55 is provided, an increase in power consumption due to charge and discharge of a parasitic capacitor of the wiring line 15, and the capacitance element 120 can be suppressed.

The switching element 55 is configured by a transmission gate, for example. An input end of the switching element 55 is coupled to the fourth transistor 503, and an output end is coupled to the transistor 504. Further, the switching element 55 is on when a control signal Zgopn is at the H level, and is off when the control signal Zgopn is at the L level. That is, the third transistor 501 is off when the control signal /Zgopn is at the H level, and is on when the control signal /Zgopn is at the L level.

A drain of the fourth transistor 503 is coupled to the wiring line 15, and a source of the fourth transistor 503 is coupled to a second constant potential line 114 that supplies the potential Vini as a "second constant potential". The potential Vini is a potential between the potential Vel as a high potential and the potential Vorst as a low potential to be described later. The control signal /Gini is supplied to a gate of the fourth transistor 503.

A drain of the transistor 504 is coupled to the data line 14, and a source of the transistor 504 is coupled to a power supplying line 115 that supplies the potential Vorst as a low potential. The control signal /Gorst is supplied to a gate of the transistor 504.

A drain of the transistor 505 is coupled to the data line 14, and a source of the transistor 505 is coupled to a power supplying line 116 that supplies the potential Vel as a high potential. That is, the transistor 505 electrically couples the data line 14 and the power supplying line 116. The control signal /Drst is supplied to a gate of the transistor 505.

In the embodiment, the transistor 505 is an example of a "second transistor". The power supplying line 116 corresponds to a "first constant potential line", and the potential Vel corresponds to a "first constant potential". Note that the transistor 504 may be regarded as the "second transistor". In this case, the power supplying line 115 corresponds to the "first constant potential line", and the potential Vorst corresponds to the "first constant potential".

Additionally, a power supplying line 117 is coupled to the data line 14 via a retention capacitor 130. The potential Vel as a high potential is supplied to the power supplying line 117. The retention capacitor 130 is a parasitic capacitor of the data line 14, and is also regarded as an inter-wiring line capacitor between the data line 14 and the power supplying line 117.

4. Operation of Display Device 1

Figure 4:
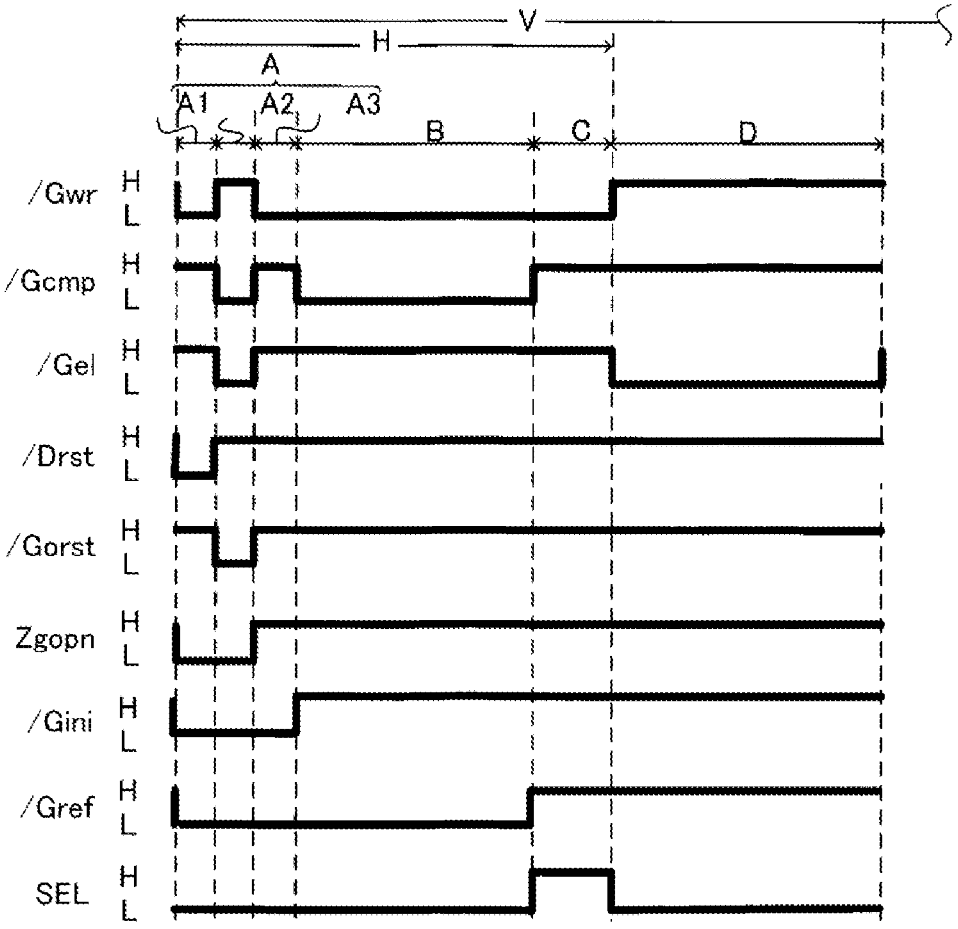
FIG. 4 is a timing chart for explaining operation of the display device.

FIG. 4 is a timing chart for explaining operation of the display device 1. One frame period V illustrated in FIG. 4 includes a plurality of horizontal scanning periods H and a plurality of light-emitting periods D. In one frame period V, the scanning lines 12 in the first to m-th rows are sequentially scanned per one horizontal scanning period H. Note that FIG. 4 illustrates one horizontal scanning period and one light-emitting period D in one frame period V. Further, one horizontal scanning period H is a period required for horizontal scanning for one row. One horizontal scanning period H includes the initialization period A, a compensation period B and a writing period C.

Note that operation of the pixel circuits 100 in each row is common in one horizontal scanning period H. Hereinafter, any one pixel circuit 100 among a plurality of pixel circuits 100 and a peripheral circuit corresponding thereto will be mainly described.

4-1. Frame Period V 4-1A. Initialization Period A

As illustrated in FIG. 4, the initialization period A includes a first initialization period A1, a second initialization period A2 and a third initialization period A3. In the initialization period A, a predetermined element included in the pixel circuit 100 is initialized.

4-1Aa. First Initialization Period A1

Figure 5:
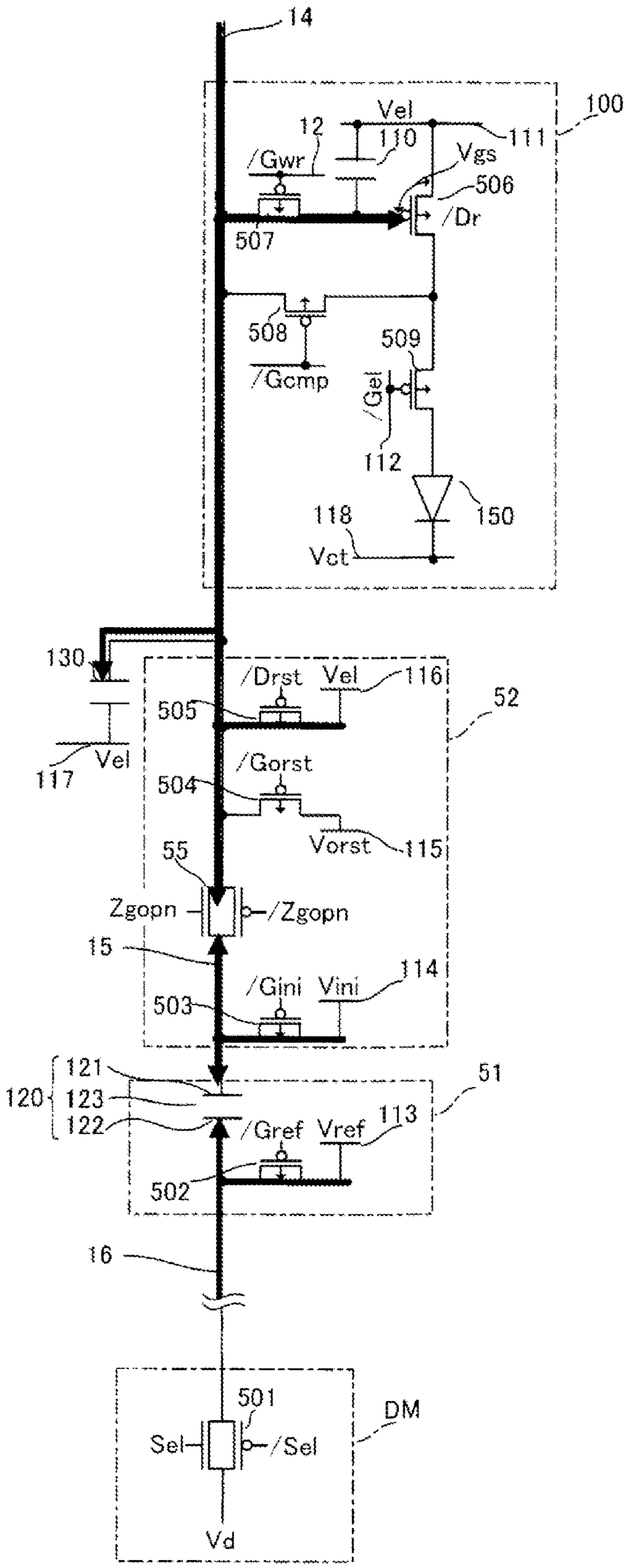
FIG. 5 is a diagram for explaining operation of the display device in a first initialization period in FIG. 4.

FIG. 5 is a diagram for explaining operation of the display device 1 in the first initialization period A1 in FIG. 4. To be specific, in the first initialization period A1, the potential Vel as a high potential is supplied to the gate of the first transistor 506. The first initialization period A1 is a period for setting the first transistor 506 to an off state.

As illustrated in FIG. 4, in the first initialization period A1, the scanning signal /Gwr and the control signal /Drst are set to the L level. Therefore, each of the transistor 507 and the transistor 505 illustrated in FIG. 5 is on. As a result, the potential Vel as a high potential is supplied to the gate of the first transistor 506 through the transistor 505, the data line 14 and the transistor 507 in this order. When the potential Vel as a high potential is supplied to the gate of the first transistor 506, the potential between the gate and the source becomes 0. For this reason, the first transistor 506 is in the off state. Further, the potential Vel is supplied to one end of the retention capacitor 130 of the data line 14.

Additionally, as illustrated in FIG. 4, the control signal /Gcmp is at the H level in the first initialization period A1.

Thus, the transistor 508 illustrated in FIG. 5 is off. Therefore, in the first initialization period A1, the first transistor 506 and the transistor 508 are off. Therefore, a path of a current supplied to the light-emitting element 150 is cut off.

Additionally, as illustrated in FIG. 4, in the first initialization period A1, the control signal Zgopn is set to the L level. Therefore, the switching element 55 illustrated in FIG. 5 is set to off. Therefore, the data line 14 and the wiring line 15 are in a decoupled state. In addition, in the first initialization period A1, each of the control signal /Gref and the control signal /Gini is set to the L level. Therefore, each of the fourth transistor 503 and the fifth transistor 502 illustrated in FIG. 5 is on. Thus, the potential Vini is supplied to the wiring line 15 and the first electrode 121 of the capacitance element 120, and the potential Vref is supplied to the second wiring line 16 and the second electrode 122 of the capacitance element 120.

Since the switching element 55 is provided, the data line 14 and the wiring line 15 can be decoupled from each other in the first initialization period A1. Therefore, in the first initialization period A1, a potential different from a potential of the data line 14 is supplied to the wiring line 15 and the second wiring line 16.

4-1Ab. Second Initialization Period A2

Figure 6:
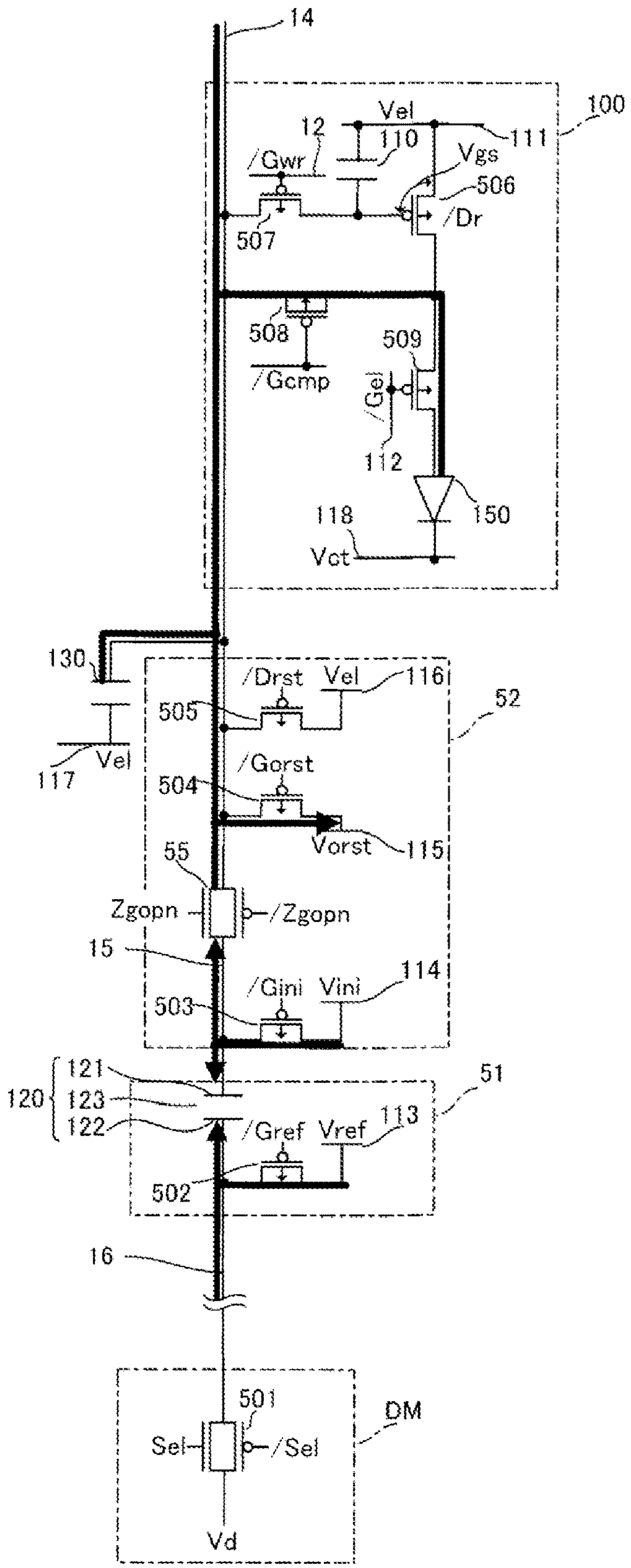
FIG. 6 is a diagram for explaining operation of the display device in a second initialization period in FIG. 4.

FIG. 6 is a diagram for explaining operation of the display device 1 in the second initialization period A2 in FIG. 4. In the second initialization period A2, the potential Vorst as a reset potential is supplied to the anode of each light-emitting element 150. The second initialization period A2 is a period for initializing the anode of the light-emitting element 150.

As illustrated in FIG. 4, in the second initialization period A2, each of the control signal /Gel, the control signal /Gcmp and the control signal /Gorst is set to the L level. Therefore, each of the transistors 508, 509 and 504 illustrated in FIG. 6 is on. As a result, the potential Vorst as a low potential is applied to the anode of the light-emitting element 150 through the transistor 504, the data line 14, and the transistors 508 and 509. When the anode of the light-emitting element 150 is reset to the potential Vorst, a charge remaining in a coupling node between the anode of the light-emitting element 150 and the transistor 509 is discharged. Therefore, in the second initialization period A2, the anode of the light-emitting element 150 is initialized to the potential Vorst.

As described above, each light-emitting element 150 has a configuration in which an organic EL layer is interposed between the anode and the cathode. Therefore, at the time of light emission, a retention capacitor is parasitic between the anode and the cathode. In the second initialization period A2, the potential Vorst is supplied to the anode to reset a potential held by the retention capacitor between the anode and the cathode. Therefore, when a drive current flows again, the light-emitting element 150 is less likely to be affected by the potential held in the retention capacitor.

Also in the second initialization period A2, as in the first initialization period A1, since the control signal Zgopn remains at the L level, the switching element 55 illustrated in FIG. 6 remains off. Therefore, the data line 14 and the wiring line 15 remain in the decoupled state. In addition, in the first initialization period A1, since each of the control signal /Gref and the control signal /Gini remains at the L level, each of the fourth transistor 503 and the fifth transistor 502 remains on. Therefore, also in the second initialization period A2, as in the first initialization period A1, a potential different from the potential of the data line 14 is supplied to the wiring line 15 and the second wiring line 16.

4-1Ac. Third Initialization Period A3

Figure 7:
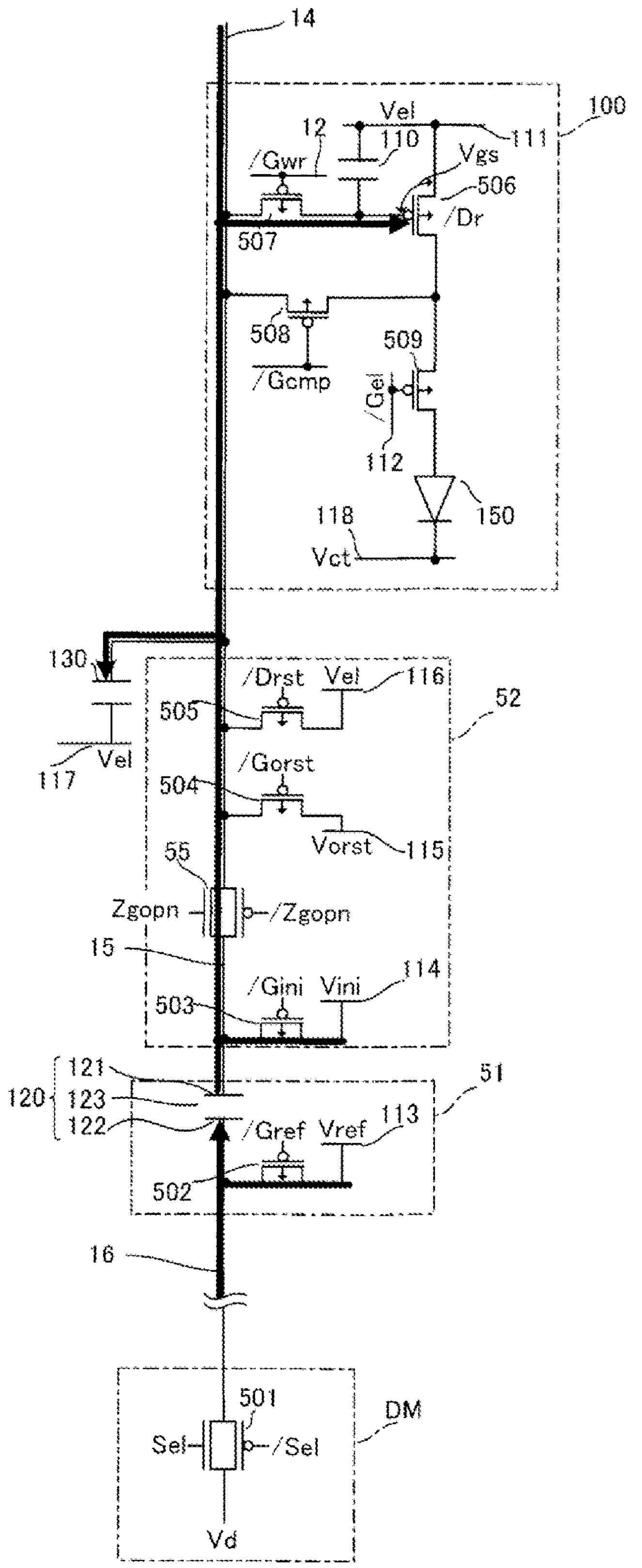
FIG. 7 is a diagram for explaining operation of the display device in a third initialization period in FIG. 4.

FIG. 7 is a diagram for explaining operation of the display device 1 in the third initialization period A3 in FIG. 4. In the third initialization period A3, the potential Vini is supplied to the gate of the first transistor 506. The third initialization period A3 is a pre-processing period for the compensation period B.

As illustrated in FIG. 4, in the third initialization period A3, the control signal Zgopn is set to the H level. Therefore, the switching element 55 illustrated in FIG. 7 is on. As a result, the data line 14 and the wiring line 15 are electrically coupled. In addition, in the third initialization period A3, each of the scanning signal /Gwr and the control signal /Gini is set to the L level. Therefore, each of the transistor 507 and the fourth transistor 503 illustrated in FIG. 7 is on. As a result, the potential Vini is supplied to the gate of the first transistor 506 and one end of the retention capacitor 110 through the fourth transistor 503, the wiring line 15, the data line 14 and the transistor 507 in this order. The potential Vini is set such that |Vel−Vini| is greater than the threshold potential |Vth| of the first transistor 506. By setting in this way, the compensation period B described later can be shortened.

In addition, since the control signal /Gref remains at the L level in the third initialization period A3, the fifth transistor 502 remains on. Thus, in the third initialization period A3, a state is continued where the potential Vref is supplied to the second wiring line 16 and the second electrode 122 of the capacitance element 120.

4-1B. Compensation Period B

Figure 8:
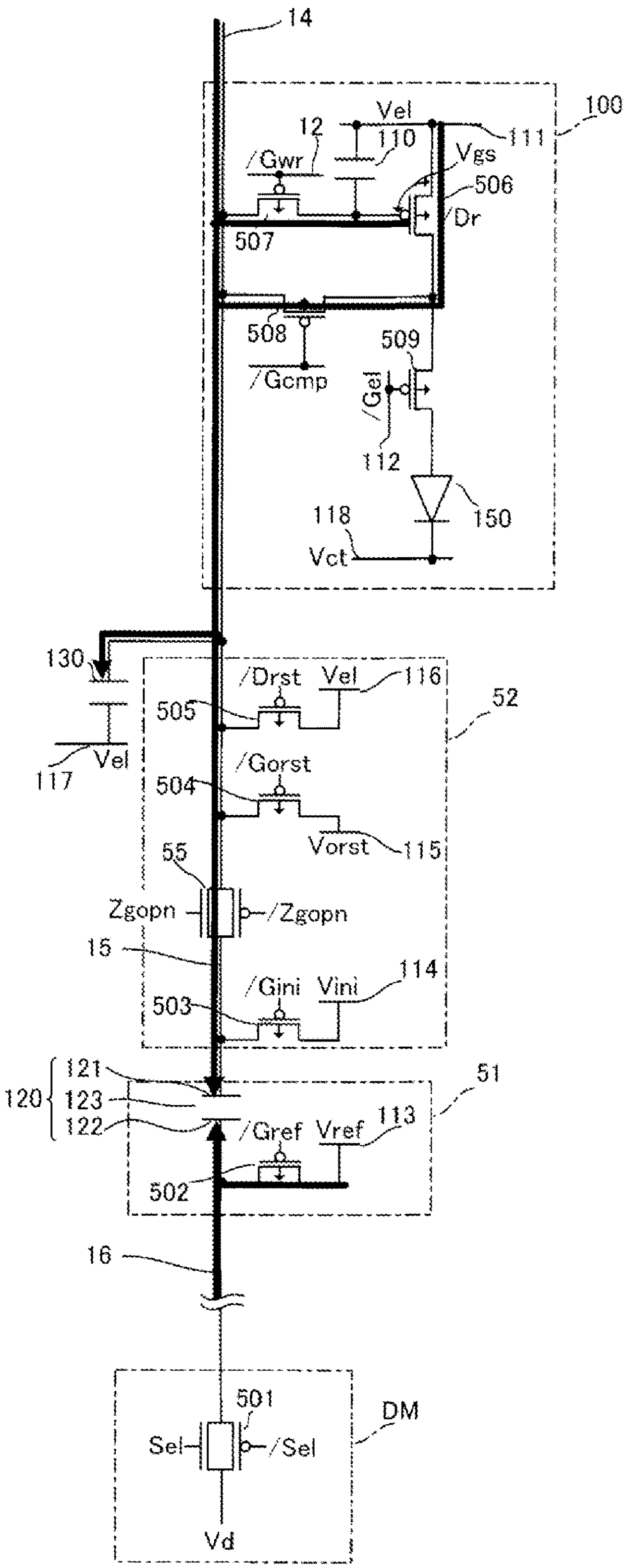
FIG. 8 is a diagram for explaining operation of the display device in a compensation period in FIG. 4.

FIG. 8 is a diagram for explaining operation of the display device 1 in the compensation period B in FIG. 4. In the compensation period B, threshold potential compensation is performed to cause the potential between the gate and the drain of the first transistor 506 to converge on the threshold potential |Vth|.

As illustrated in FIG. 4, in the compensation period B, since the control signal Zgopn remains at the H level, the data line 14 and the wiring line 15 illustrated in FIG. 8 are in a state of being electrically coupled to each other. In addition, in the compensation period B, each of the scanning signal /Gwr and the control signal /Gcmp is set to the L level. Therefore, each of the transistor 507 and the transistor 508 illustrated in FIG. 8 is on. Therefore, the drain of the first transistor 506 is coupled to the gate of the first transistor 506 through the transistor 508, the data line 14 and the transistor 507 in order. Thus, the first transistor 506 is in a diode-coupled state. Therefore, the potential of each of the data line 14 and the gate of the first transistor 506 increases from the potential Vini and is saturated at a potential (Vel−|Vth|). In addition, the retention capacitor 110 holds the threshold potential |Vth| of the first transistor 506, and the potential between the gate and the drain of the first transistor 506 converges on the threshold potential |Vth|.

In addition, in the compensation period B, since the control signal /Gref remains at the L level, the fifth transistor 502 remains on. Thus, in the compensation period B, the state is continued where the potential Vref is supplied to the second wiring line 16 and the second electrodes 122 of the capacitance element 120.

4-1C. Writing Period C

Figure 9:
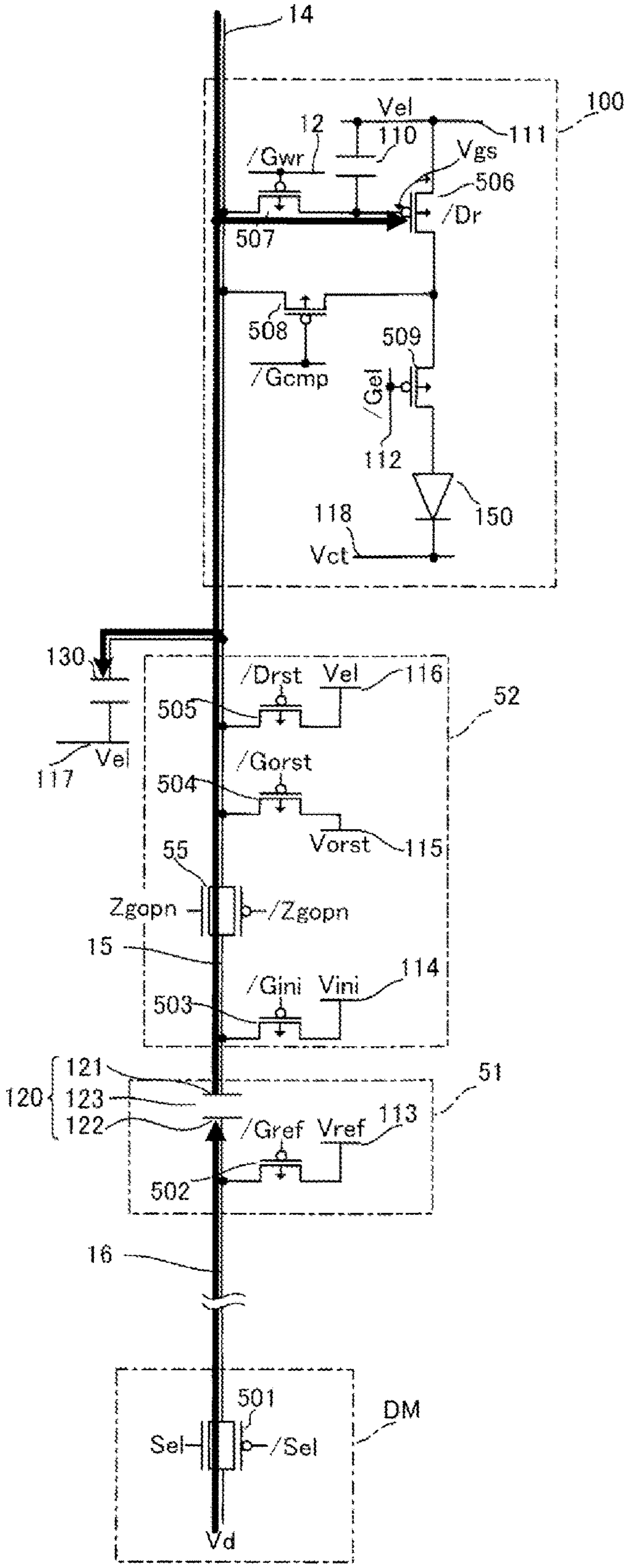
FIG. 9 is a diagram for explaining operation of the display device in a writing period in FIG. 4.

FIG. 9 is a diagram for explaining operation of the display device 1 in the writing period C in FIG. 4. In the writing period C, data writing processing in which a potential corresponding to the video signal Vd is supplied to the gate of the first transistor 506 is performed.

As illustrated in FIG. 4, in the writing period C, the scanning signal /Gwr remains set to the L level, while the control signal /Gcmp is set to the H level. Therefore, as illustrated in FIG. 9, the diode-coupled state of the first transistor 506 is released.

Further, in the writing period C, the control signal Sel is set to the H level, and the control signal /Gref is set to the H level. Therefore, the fifth transistor 502 is off, and the third transistor 501 is on. Thus, a potential of one end of the capacitance element 120 changes from the potential Vref to a potential of the video signal Vd. A potential for this change is represented by ΔV. This change in potential is propagated to the gate of the first transistor 506 through the second wiring line 16, the capacitance element 120, the wiring line 15, the data line 14 and the transistor 507 in this order.

In addition, the gate of the first transistor 506 has a value (Vel−|Vth|+k1·ΔV) obtained by shifting the potential (Vel−|Vth|) in the compensation period B in an upward direction by a value obtained by multiplying ΔV for the above-described potential change by a capacitor ratio k1. Therefore, the potential Vgs between the gate and the source of the first transistor 506 becomes Vel−(Vel−|Vth|+k1·ΔV)=(|Vth|−k1·ΔV).

Note that the capacitor ratio k1 is Crf/(Cpara+Crf). Note that Crf is a capacitor of the capacitance element 120. Cpara is a capacitor of the retention capacitor 130. Further, a capacitor of the retention capacitor 110 is denoted as Cpix. A relationship among the capacitor Cpix of the retention capacitor 110, the capacitor Cpara of the retention capacitor 130 and the capacitor Crf of the capacitance element 120 is Cpara>Crf>>Cpix. The capacitor Cpix is sufficiently smaller than the capacitors Crf and Cpara. Therefore, the capacitors are not considered in the capacitor ratio k1.

4-1D. Light-Emitting Period D

Figure 10:
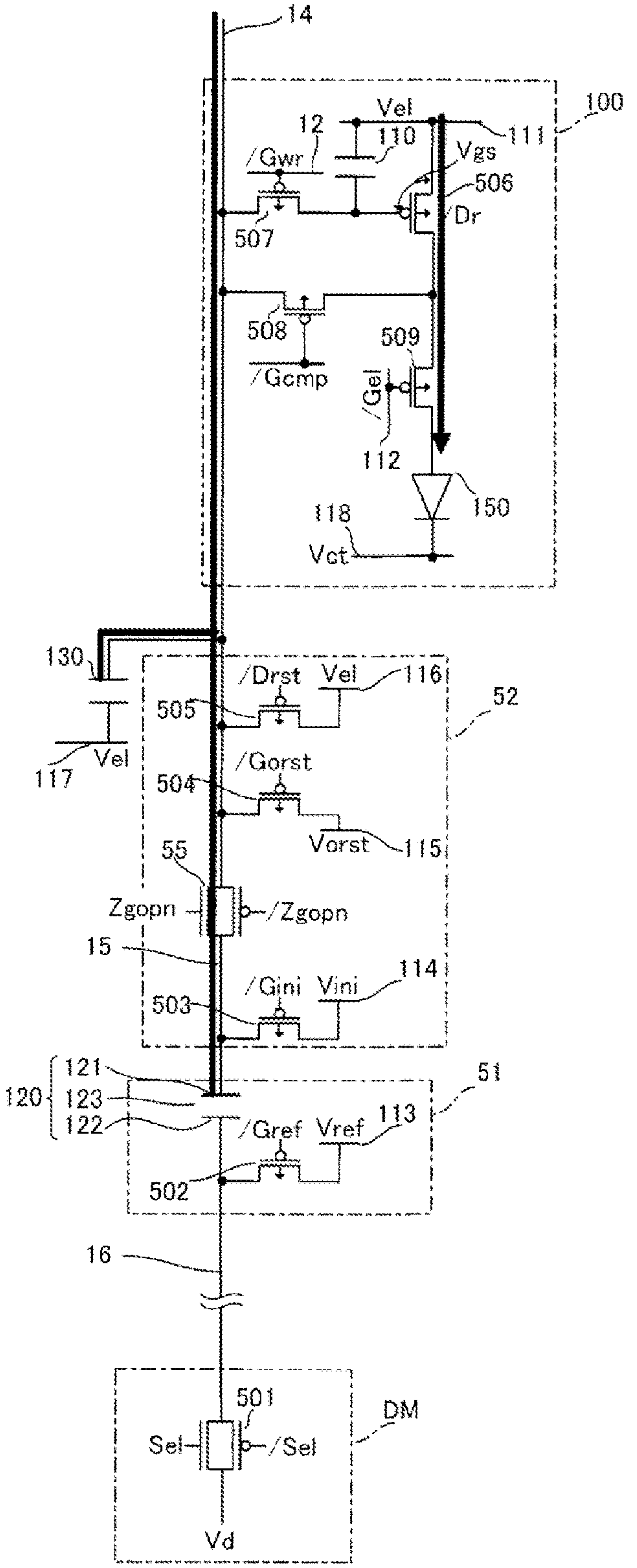
FIG. 10 is a diagram for explaining operation of the display device in a light-emitting period in FIG. 4.

FIG. 10 is a diagram for explaining operation of the display device 1 in the light-emitting period D in FIG. 4. In the light-emitting period D, the light-emitting element 150 emits light.

As illustrated in FIG. 4, in the light-emitting period D, the scanning signal /Gwr changes to the H level, the scanning signals /Gcmp and /Gorst maintain at the H level, and the control signal /Gel changes to the L level. Therefore, the transistor 507 and the transistor 508 illustrated in FIG. 10 are off, and the transistor 509 is on. As a result, a drive current corresponding to the potential Vgs of the first transistor 506 is supplied to the light-emitting element 150. The potential Vgs in the light-emitting period D is a potential obtained by level shifting from the threshold potential of the first transistor 506 in accordance with the potential of the video signal Vd. For this reason, in the light-emitting period D, a current corresponding to a gray scale level is supplied to the light-emitting element 150 in a state where the threshold potential of the first transistor 506 is compensated.

As described above, the display device 1 includes the light-emitting element 150, the data line 14, the wiring line 15, the power supplying line 116 as the "first constant potential line", the first transistor 506 as the drive transistor, the transistor 505 used in initialization, and the switching element 55. The switching element 55 controls the electrical coupling between the data line 14 and the wiring line 15. When the switching element 55 is on, the data line 14 and the wiring line 15 are coupled to each other. When the switching element 55 is off, the data line 14 and the wiring line 15 are decoupled from each other.

By providing such a switching element 55, it is possible to suppress an increase in power consumption due to charge and discharge of the capacitance element 120 when the wiring line 15 is provided with the capacitance element 120. Specifically, in the initialization period A of the horizontal scanning period H, an increase in power consumption due to the charge and discharge of the capacitance element 120 can be suppressed.

As described above, in the first initialization period A1, as illustrated in FIG. 5, the retention capacitor 130 of the data line 14 and the gate of the first transistor 506 are charged to the potential Vel as a high potential from the potential of the data line 14 in the light-emitting period D. In the first initialization period A1, the switching element 55 is set to off, so that the data line 14 and the wiring line 15 are decoupled from each other. Therefore, in the first initialization period A1, the first electrode 121 of the capacitance element 120 is not charged to the potential Vel as a high potential. The potential Vini as an intermediate potential is supplied to the first electrode 121. Further, the potential Vref is supplied to the second electrode 122. Therefore, power consumption of the capacitance element 120 can be reduced as compared with a case where the first electrode 121 is charged to the potential Vel as a high potential.

In addition, in the second initialization period A2, as illustrated in FIG. 6, the retention capacitor 130 of the data line 14, and the anode of the light-emitting element 150 are discharged from the potential Vel as a high potential to the potential Vorst as a low potential. In the second initialization period A2, the switching element 55 is set to off, so that the data line 14 and the wiring line 15 are decoupled from each other. Therefore, in the second initialization period A2, the first electrode 121 of the capacitance element 120 is not discharged to the potential Vorst as a low potential. The potential of the first electrode 121 is maintained at the potential in the first initialization period A1 and remains at the potential Vini. In addition, the second electrode 122 remains at the potential Vref. Therefore, the capacitance element 120 is not charged or discharged. Thus, power consumption can be reduced.

In addition, in the third initialization period A3, the switching element 55 is set to on, thus the data line 14 and the wiring line 15 are electrically coupled to each other. Then, as illustrated in FIG. 7, the retention capacitor 130 of the data line 14 and the gate of the first transistor 506 are charged from the potential Vorst as a low potential to the potential Vini as an intermediate potential. The potential of the first electrode 121 in the third initialization period A3 remains at the potential in the first initialization period A1 and the second initialization period A2, and remains at the potential Vini. In addition, the second electrode 122 remains at the potential Vref. Therefore, the capacitance element 120 is not charged or discharged. Thus, power consumption can be reduced.

As described above, since the switching element 55 is provided, the first electrode 121 of the capacitance element 120 is kept constant at the potential Vini in the initialization period A. Further, the second electrode 122 is kept constant at the potential Vref. Therefore, the capacitance element 120 is prevented from being charged and discharged a plurality of times in the initialization period A. Thus, an increase in power consumption can be suppressed. Furthermore, an increase in power consumption due to charge and discharge of the parasitic capacitor of the wiring line 15 provided with the capacitance element 120 can be suppressed.

Figure 11:
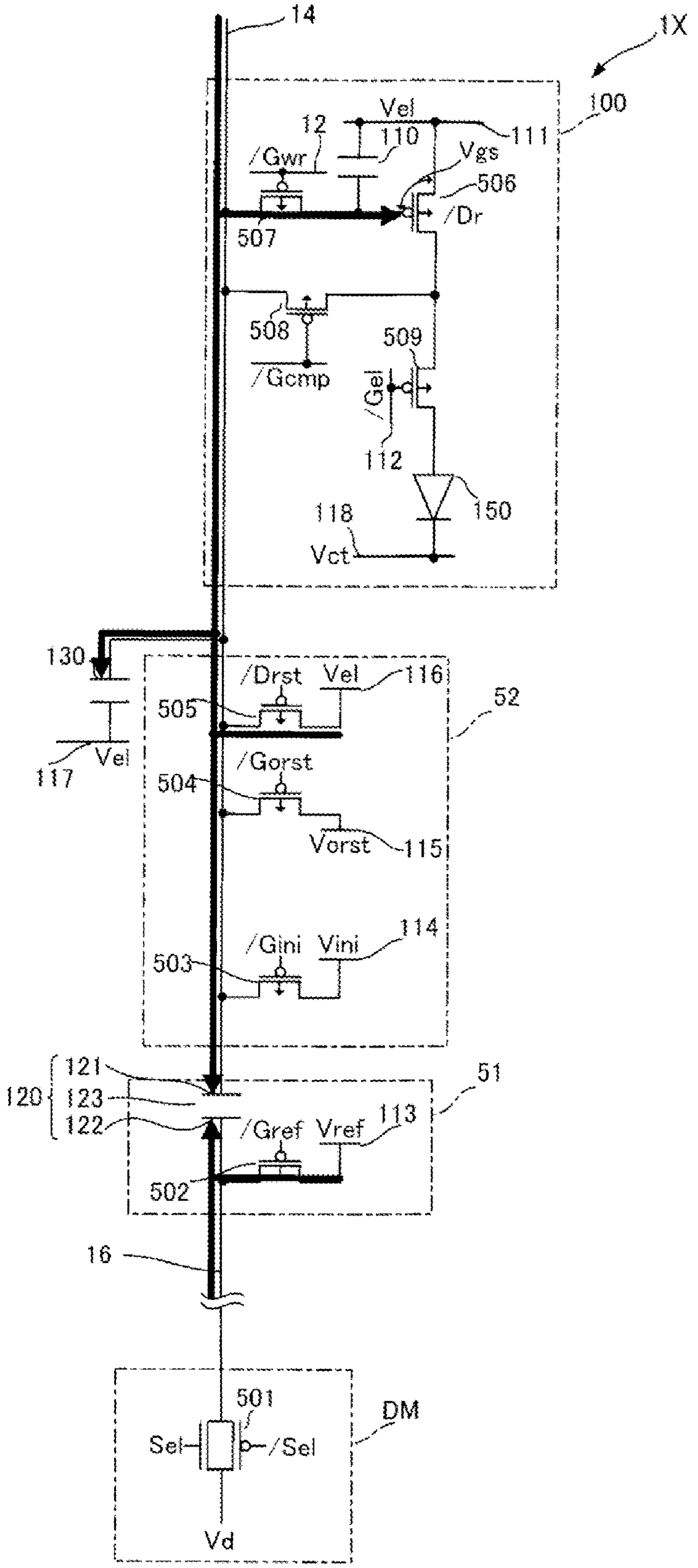
FIG. 11 is a diagram for explaining operation of a display device of a comparative example in a first initialization period.

FIG. 11 is a diagram for explaining operation of a display device 1X of a comparative example in the first initialization period A1. In the comparative example, the switching element 55 and the wiring line 15 are not provided, and the data line 14 is provided with the capacitance element 120. As illustrated in FIG. 11, in the comparative example, in the first initialization period A1, the first electrode 121 of the capacitance element 120 is charged to the potential Vel as a high potential from the potential of the data line 14 in the light-emitting period D.

Figure 12:
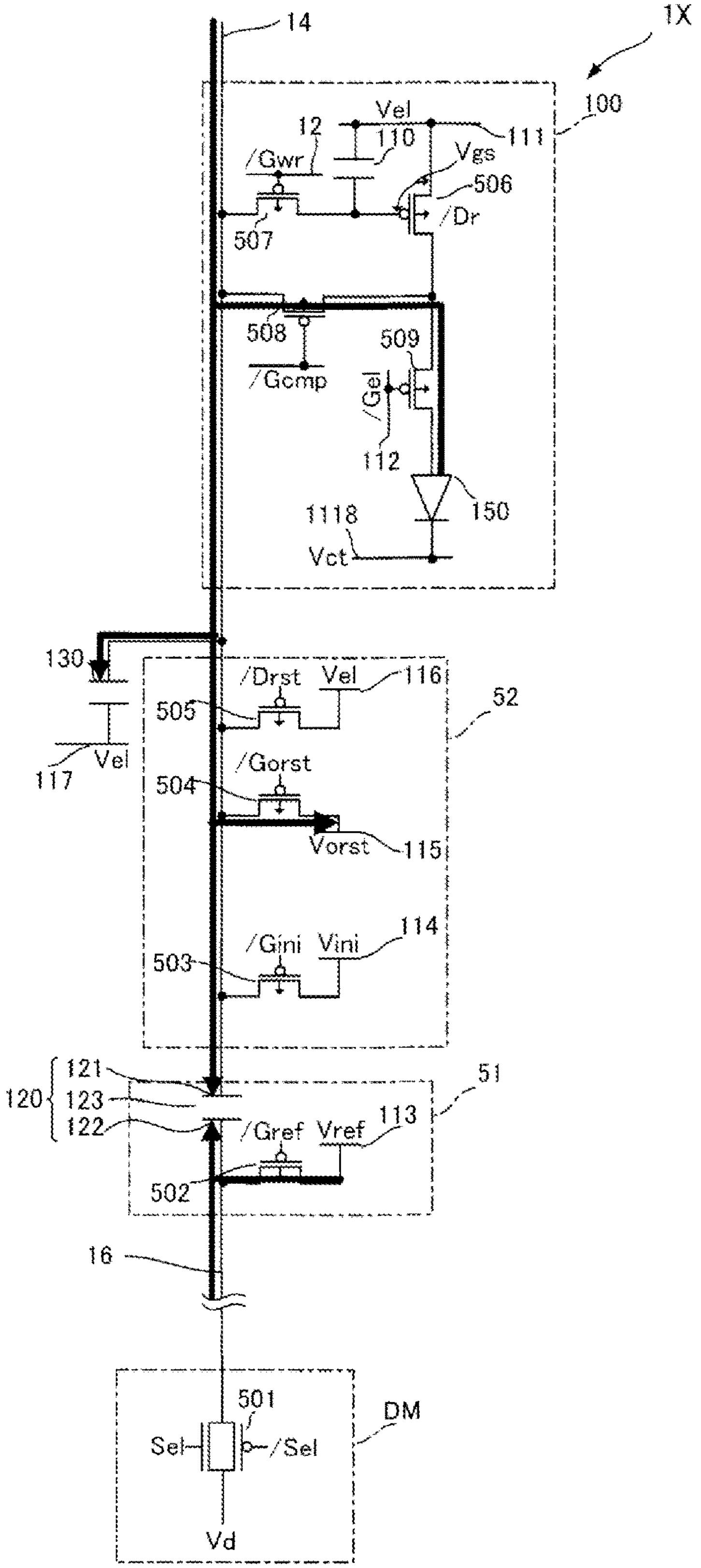
FIG. 12 is a diagram for explaining operation of the display device of the comparative example in a second initialization period.

FIG. 12 is a diagram for explaining operation of the display device 1X of the comparative example in the second initialization period A2. As illustrated in FIG. 12, in the comparative example, in the second initialization period A2, the first electrode 121 of the capacitance element 120 is discharged from the potential Vel as a high potential to the potential Vorst as a low potential. In addition, in the third initialization period A3, the first electrode 121 of the capacitance element 120 is charged from the potential Vorst as a low potential to the potential Vini as an intermediate potential.

In the comparative example, since the switching element 55 and the wiring line 15 are not provided and the data line 14 is provided with the capacitance element 120, the capacitance element 120 is charged and discharged a plurality of times in the initialization period A as compared with the embodiment. Therefore, in the comparative example, power consumption increases as compared with the embodiment.

Note that the capacitance element 120 may be omitted, when a video signal is not compressed. Even in this case, since the switching element 55 and the wiring line 15 are provided, it is possible to suppress charge and discharge of the parasitic capacitor of the wiring line 15 by turning off the switching element 55 in the first initialization period A1 and the second initialization period A2. Thus, power consumption can be reduced.

Additionally, as described above, the display device 1 includes the third transistor 501 and the capacitance element 120. The third transistor controls supplying of a potential corresponding to the video signal Vd to the second wiring line 16, the wiring line 15 and the data line 14. Therefore, the potential corresponding to the video signal Vd is supplied to the data line 14 via the second wiring line 16 and the wiring line 15. As described above, when the capacitance element 120 is present, since the switching element 55 is provided, an increase in power consumption due to charge and discharge can be suppressed. Thus, when the capacitance element 120 is present, an increase in power consumption due to charge and discharge of the capacitance element 120 in addition to charge and discharge of the parasitic capacitor of the wiring line 15 can be suppressed. Therefore, when the capacitance element 120 is present, it is particularly effective to provide the display device 1 with the switching element 55.

The display device 1 includes the fourth transistor 503. The fourth transistor 503 electrically couples the first electrode 121 and the second constant potential line 114 to each other. Therefore, the first electrode 121 can be kept constant at the potential Vini in the initialization period A. Thus, an increase in power consumption due to charge and discharge of the capacitance element 120 is suppressed.

Furthermore, the display device 1 includes the fifth transistor 502. The fifth transistor 502 electrically couples the second electrode 122 and the third constant potential line 113 to each other. Therefore, the second electrode 122 can be kept constant at the potential Vref in the initialization period A. Thus, an increase in power consumption due to charge and discharge of the capacitance element 120 is suppressed.

B. Second Embodiment

A second embodiment will be described. Note that in each of the following examples, reference numerals used in the description of the first embodiment are used for elements having similar functions to those of the first embodiment, and each detailed description thereof will be appropriately omitted.

Figure 13:
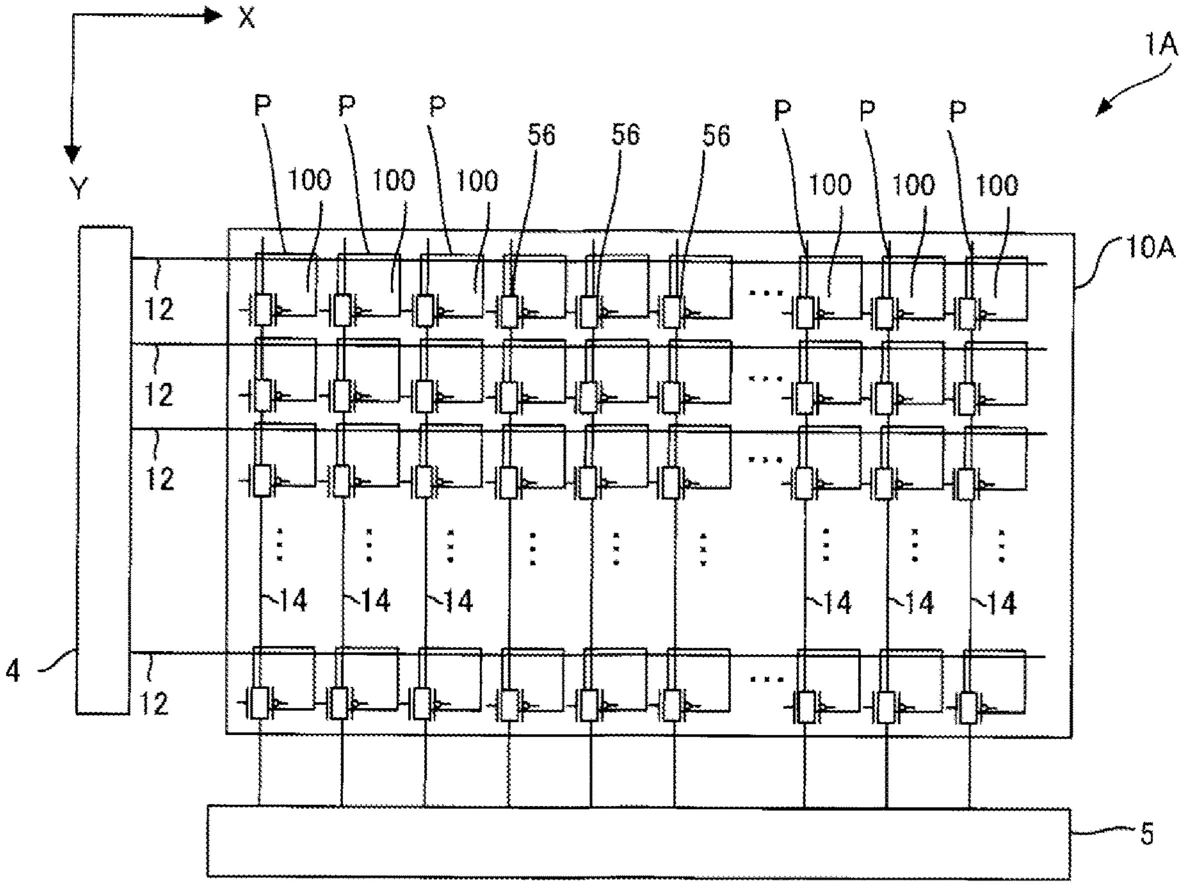
FIG. 13 is a block diagram illustrating a configuration of a display device of a second embodiment.
Figure 14:
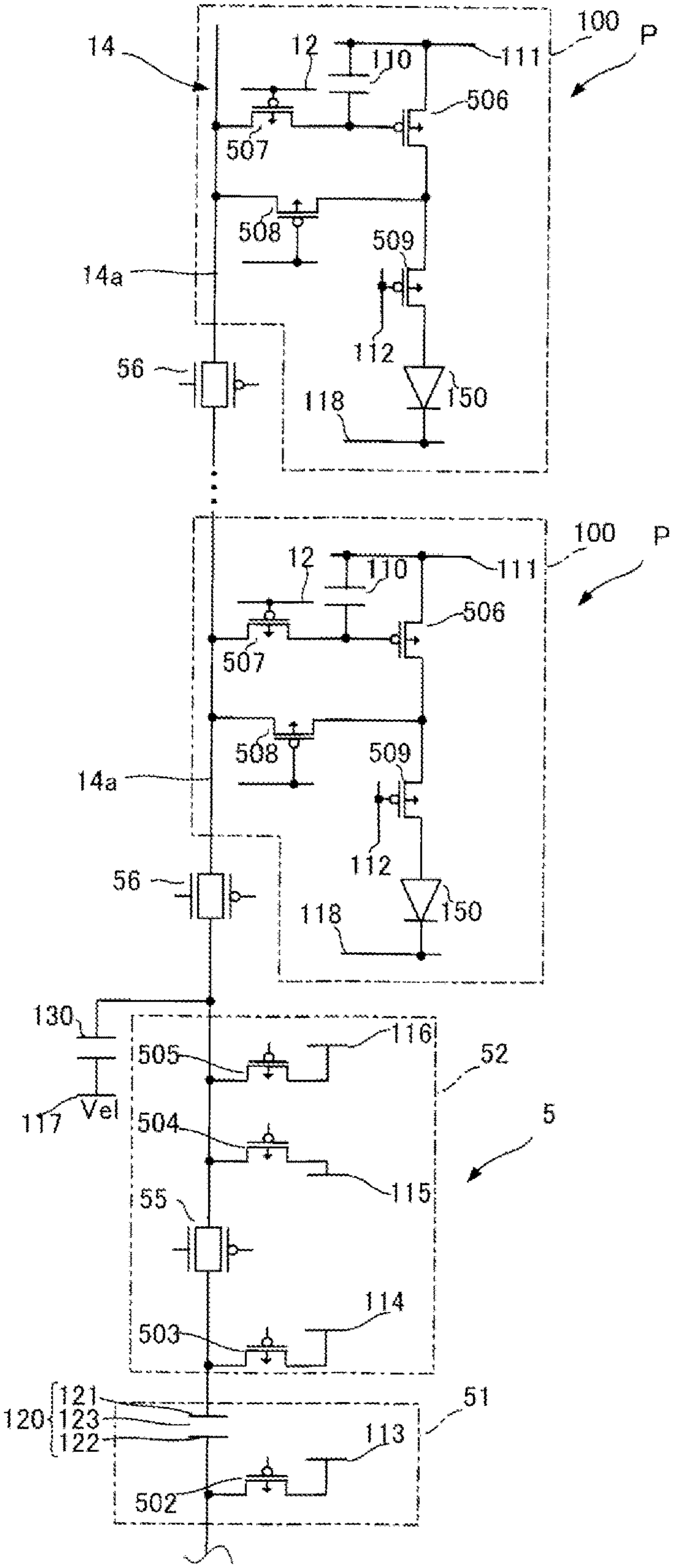
FIG. 14 is a diagram of a configuration example of a pixel circuit and a data line driving circuit illustrated in FIG. 13.

FIG. 13 is a block diagram illustrating a configuration of a display device 1A of the second embodiment. FIG. 14 is a diagram of a configuration example of the pixel circuit 100 and the data line driving circuit 5 illustrated in FIG. 13.

The display device 1A of the second embodiment is different from the display device 1 of the first embodiment in that a plurality of second switching elements 56 are included and the data line 14 is divided into a plurality of data lines 14*a*.

As illustrated in FIG. 13, the display device 1A includes the plurality of second switching elements 56. The second switching element 56 is provided for each row. In other words, the second switching element 56 is provided for each pixel circuit 100.

As illustrated in FIG. 14, the data line 14 is divided into the plurality of data lines 14*a*. Specifically, the data line 14 is divided into parts for respective rows. Therefore, the plurality of data lines 14*a* are provided for the respective pixel circuits 100. In other words, the plurality of data lines 14*a* are coupled to each other via the second switching elements 56 for each column. Therefore, one data line 14*a* is coupled to another data line 14*a* via the second switching element 56. Note that the retention capacitor 130 is a parasitic capacitor for one column.

Figure 15:
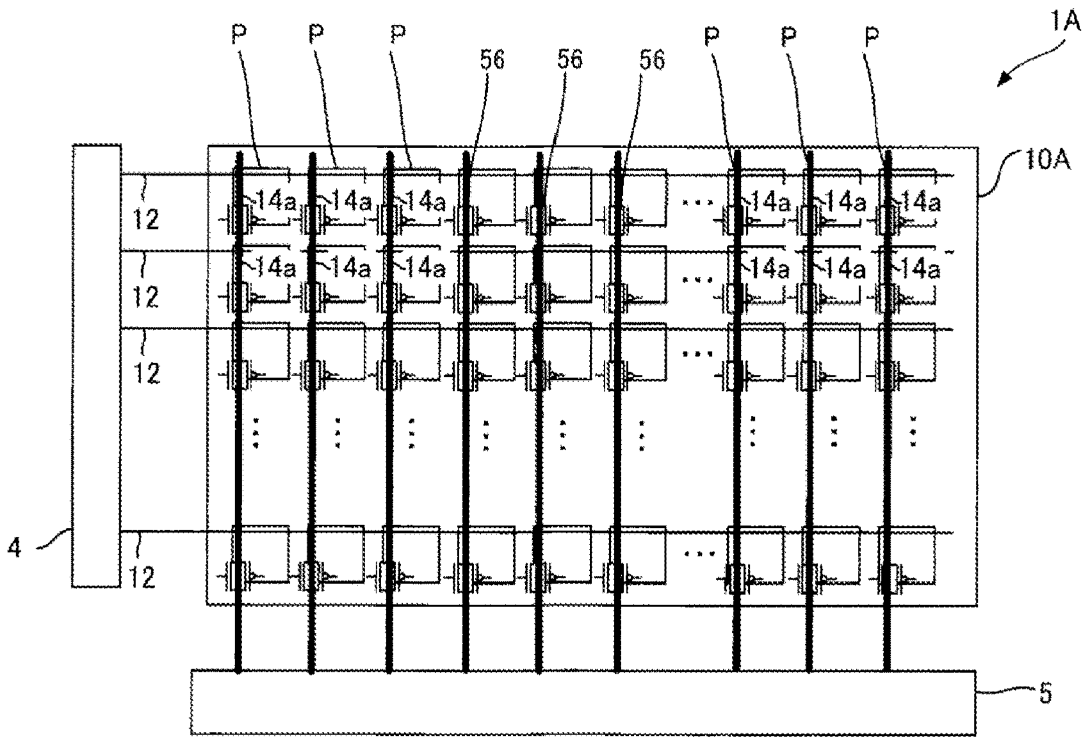
FIG. 15 is a diagram for explaining operation of the display device illustrated in FIG. 13.
Figure 16:
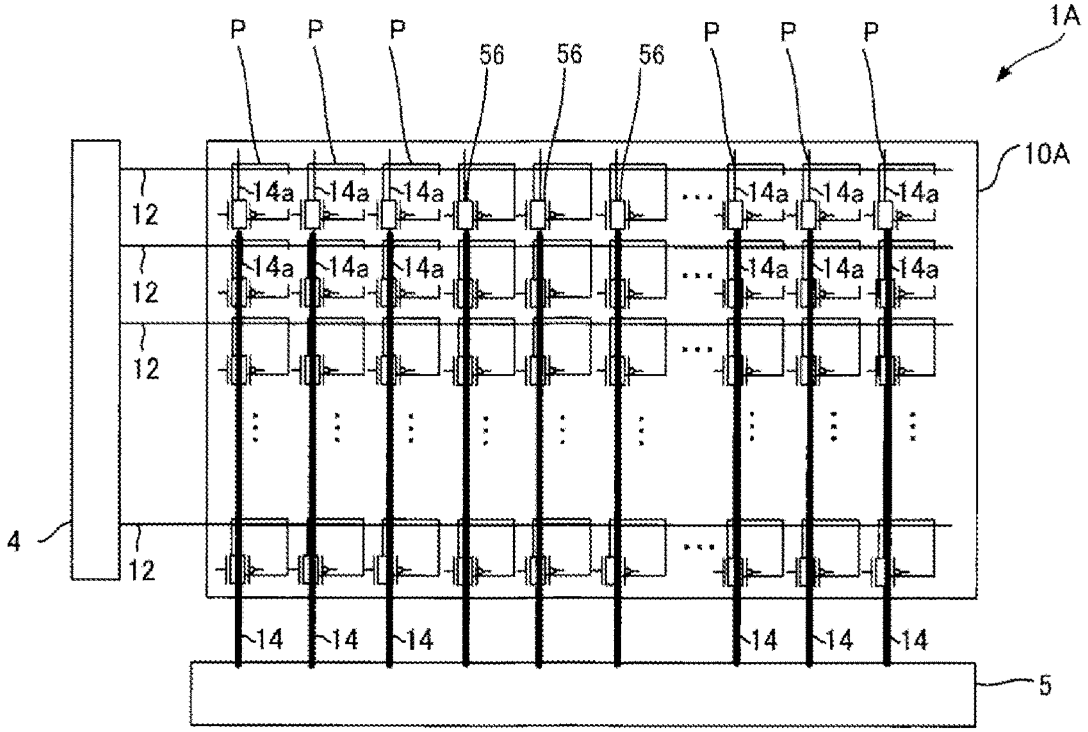
FIG. 16 is a diagram for explaining the operation of the display device illustrated in FIG. 13.

Each of FIG. 15 and FIG. 16 is a diagram for explaining the operation of the display device 1A illustrated in FIG. 13. In the embodiment, the second switching elements 56 are sequentially set to off from a row in which data writing processing is completed.

As illustrated in FIG. 15, first, all the second switching elements 56 are set to on. In this state, the data writing processing is performed in the pixels P corresponding to the first row from a top of the display unit 10. When the data writing processing in the pixels P in the first row is completed, the second switching elements 56 corresponding to the pixels P in the first row are turned off. Next, as illustrated in FIG. 16, the data writing processing is performed in the pixels P in the second row. In the data writing processing in the pixels P in the second row, since the second switching elements 56 corresponding to the first row are set to off, the data line 14*a* corresponding to the first row and the data line 14*a* corresponding to the second row are in the decoupled state. When the data writing processing in the pixels P in the second row is completed, the second switching elements 56 corresponding to the pixels P in the second row are turned off. In this way, the second switching elements 56 are sequentially set to off.

As described above, since the plurality of second switching elements 56 are provided for each row, the second switching elements 56 can be sequentially turned off row by row. Therefore, an amount of charge and discharge of the retention capacitor 130 in the initialization period A decreases. Therefore, in the embodiment, it is possible to further suppress an increase in power consumption due to the charge and discharge of the retention capacitor 130 compared to the first embodiment. Thus, power consumption can be reduced as compared to the first embodiment.

Also in the embodiment, since the switching element 55 is provided as in the first embodiment, it is possible to suppress an increase in power consumption due to charge and discharge of the parasitic capacitor of the wiring line 15 and the capacitance element 120.

C. Third Embodiment

A third embodiment will be described. Note that in each of the following examples, reference numerals used in the description of the first embodiment are used for elements having similar functions to those of the first embodiment, and each detailed description thereof will be appropriately omitted.

Figure 17:
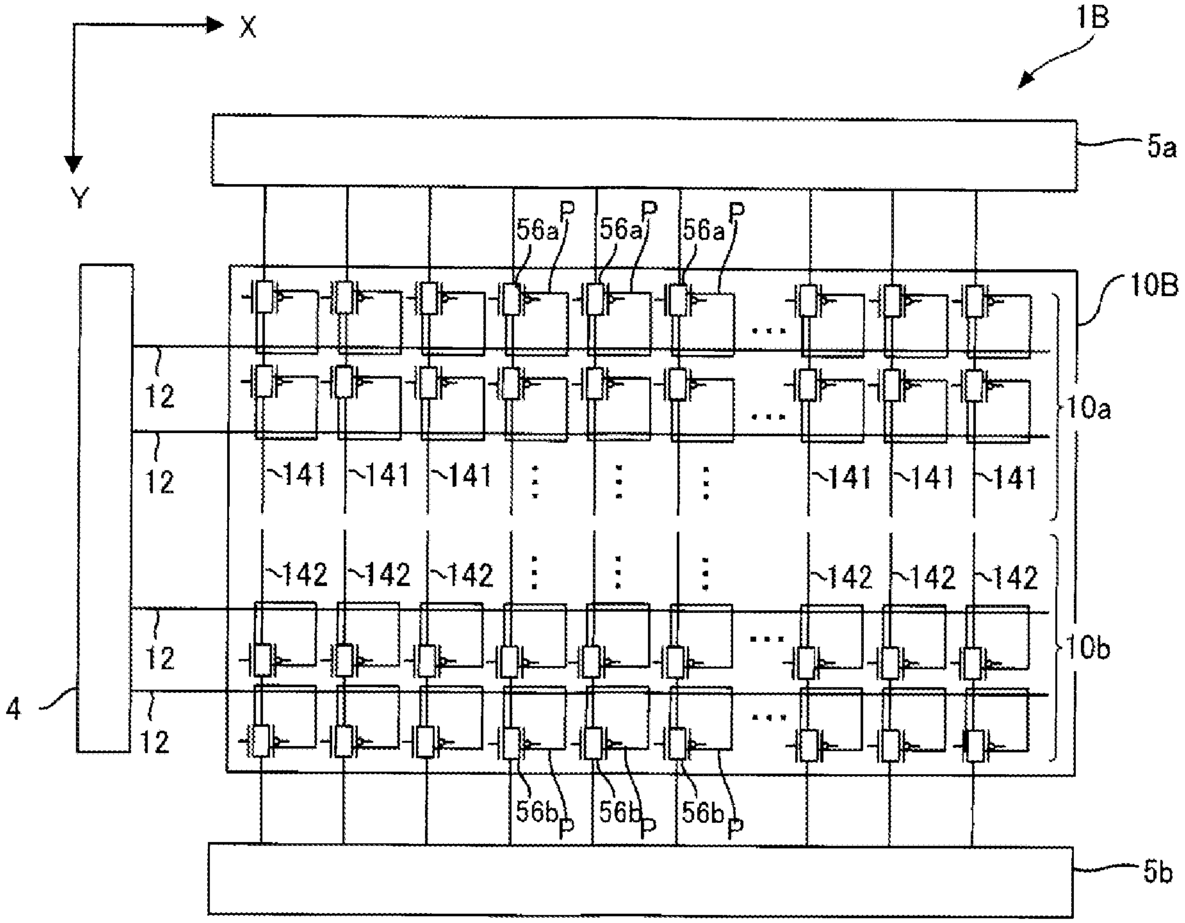
FIG. 17 is a block diagram illustrating a configuration of a display device of a third embodiment.
Figure 18:
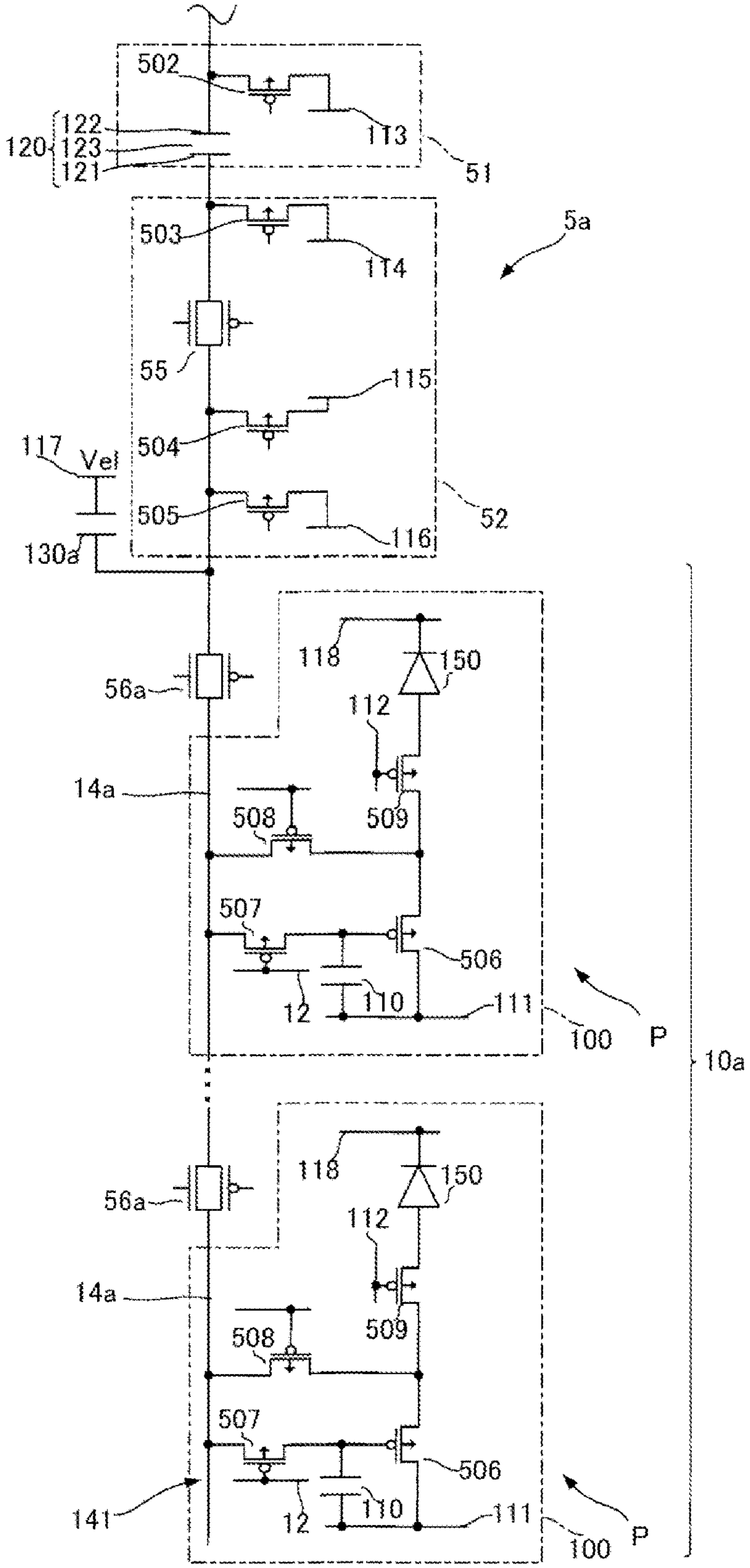
FIG. 18 is a diagram of a configuration example of an upper circuit and a data line driving circuit illustrated in FIG. 17.
Figure 19:
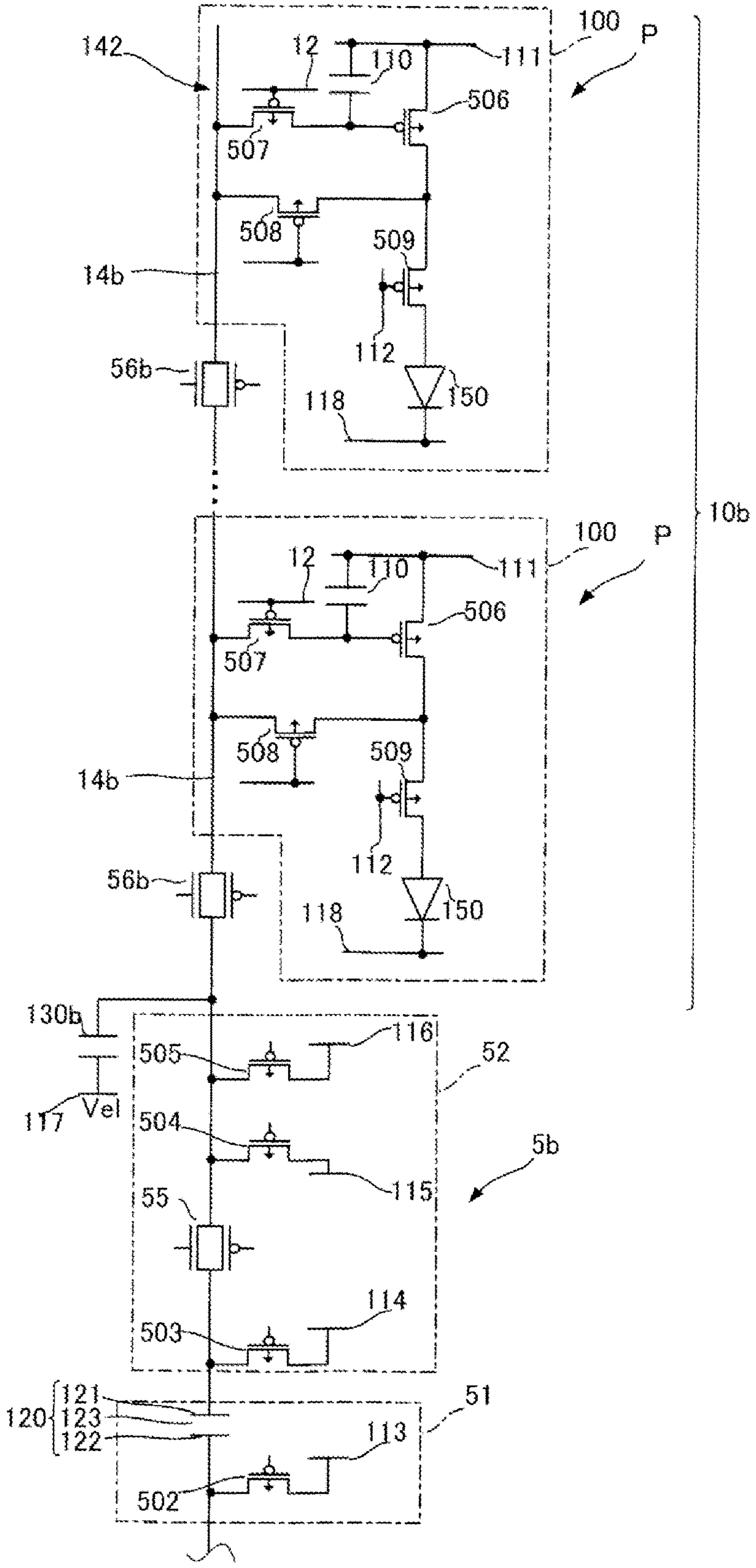
FIG. 19 is a diagram of a configuration example of a lower circuit and a data line driving circuit illustrated in FIG. 17.

FIG. 17 is a block diagram illustrating a configuration of a display device 1B of the third embodiment. FIG. 18 is a diagram of a configuration example of an upper circuit 10*a* and a data line driving circuit 5*a* illustrated in FIG. 17. FIG. 19 is a diagram of a configuration example of a lower circuit 10*b* and a data line driving circuit 5*b* illustrated in FIG. 17.

A display unit 1B of the display device 10B of the third embodiment is different from the display device 1 of the first embodiment in that the upper circuit 10*a* and the lower circuit 10*b* are included, and the data line driving circuit 5*a* and the data line driving circuit 5*b* are included.

As illustrated in FIG. 17, each data line 14 is divided into a first data line 141 and a second data line 142. The upper circuit 10*a* is provided with the first data line 141, and the lower circuit 10*b* is provided with the second data line 142. Further, the data line driving circuit 5*a* is electrically coupled to the first data line 141 of the upper circuit 10*a*. The data line driving circuit 5*b* is electrically coupled to the second data line 142 of the lower circuit 10*b*. Note that the data line driving circuits 5*a* and 5*b* have a configuration and a function similar to those of the data line driving circuit 5 of the first embodiment. Therefore, although not illustrated in detail, each of the data line driving circuits 5*a* and 5*b* includes the initialization circuit 52, the auxiliary circuit 51, the demultiplexer DM and the data signal supplying circuit 50.

As illustrated in FIG. 18, the upper circuit 10*a* is provided with a plurality of second switching elements 56*a*. The plurality of second switching elements 56*a* are provided for the respective rows. In other words, the plurality of second switching elements 56*a* are provided for the respective pixel circuits 100. As illustrated in FIG. 18, the first data line 141 is divided into a plurality of the data lines 14*a*. The plurality of the data lines 14*a* are coupled to each other via the second switching elements 56*a* for each column. Therefore, one data line 14*a* is coupled to another data line 14*a* via the second switching element 56*a*. Note that the retention capacitor 130*a* is a parasitic capacitor for one column.

As illustrated in FIG. 19, the lower circuit 10*b* is provided with a plurality of second switching elements 56*b*. The plurality of second switching elements 56*b* are provided for the respective rows. In other words, the plurality of second switching elements 56*b* are provided for the respective pixel circuits 100. Further, the second data line 142 is divided into a plurality of data lines 14*b*. The plurality of the data lines 14*b* are coupled to each other via the second switching elements 56*b* for each column. Therefore, one data line 14*b* is coupled to another data line 14*b* via the second switching element 56*b*. Note that a retention capacitor 130*b* is a parasitic capacitor for one column.

Figure 20:
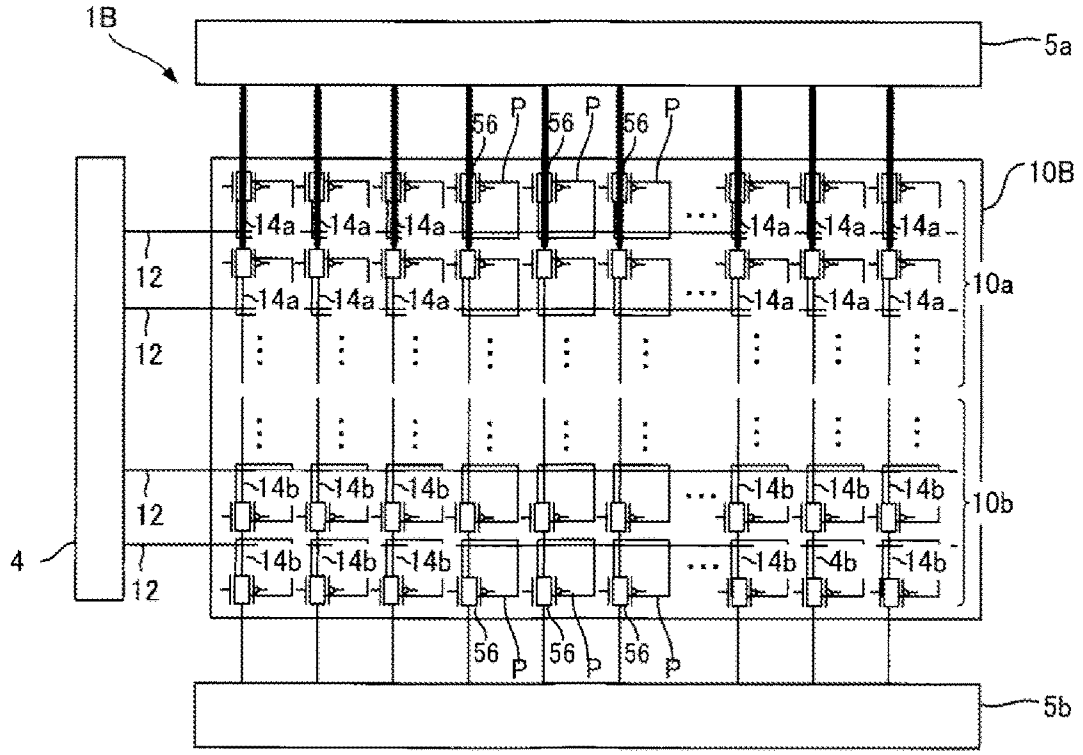
FIG. 20 is a diagram for explaining operation in the upper circuit illustrated in FIG. 17.
Figure 21:
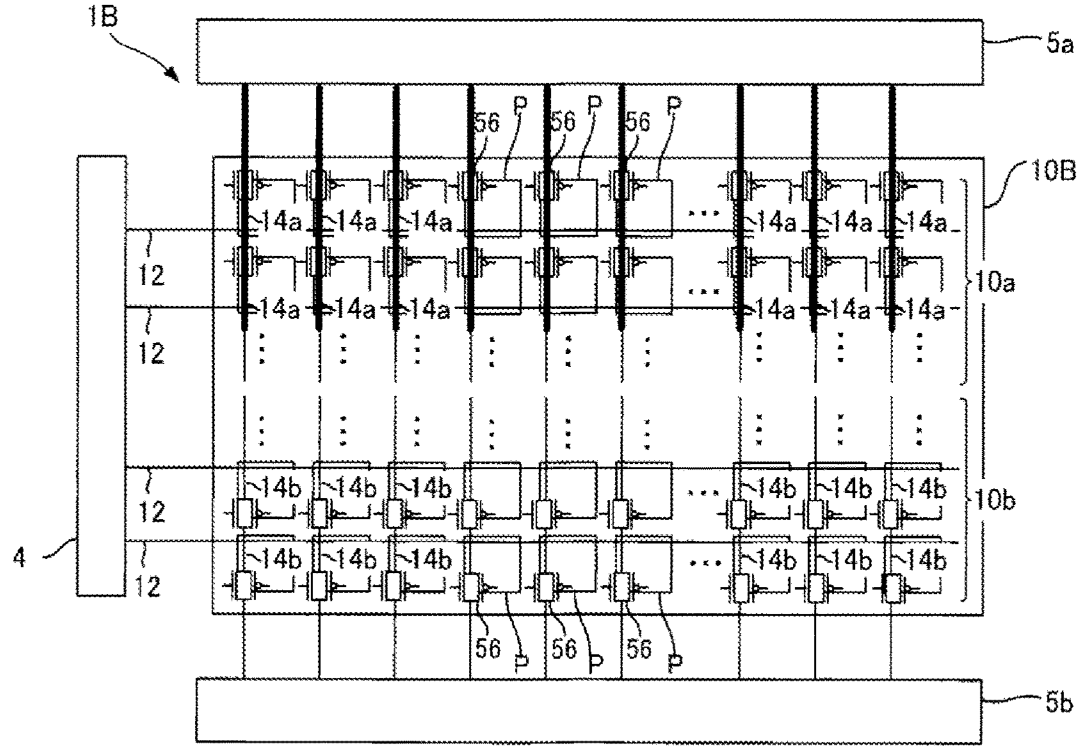
FIG. 21 is a diagram for explaining the operation in the upper circuit illustrated in FIG. 17.

FIG. 20 and FIG. 21 are each a diagram for explaining operation in the upper circuit 10*a* illustrated in FIG. 17. In the upper circuit 10*a*, the second switching elements 56*a* are sequentially set to on from a row in which data writing is completed.

As illustrated in FIG. 20, first, the second switching elements 56*a* corresponding to the first row are set to on, and the other switching elements are set to off. In this state, the data writing processing is performed in the pixels P in the first row. In the data writing processing in the pixels P in the first row, since the second switching elements 56*a* corresponding to the second row are set to off, the data line 14*a* corresponding to the second row and the data line 14*a* corresponding to the first row are in the decoupled state. As illustrated in FIG. 21, when the data writing processing in the pixels P in the first row is completed, the second switching elements 56*a* corresponding to the pixels P in the second row are turned on, and the data writing processing in the pixels P in the second row is performed. When the data writing processing in the pixels P in the second row is completed, the second switching elements 56*a* corresponding to the pixels P in the second row are turned on. In this way, the plurality of second switching elements 56*a* are sequentially set to on from the first row.

As described above, in the upper circuit 10*a*, since the plurality of second switching elements 56*a* are provided for each row, the second switching elements 56*a* are set to on in order from the top. Therefore, an amount of charge and discharge of the retention capacitor 130*a* gradually increases. However, it is possible to suppress an increase in power consumption due to the charge and discharge of the retention capacitor 130*a* as a whole.

Figure 22:
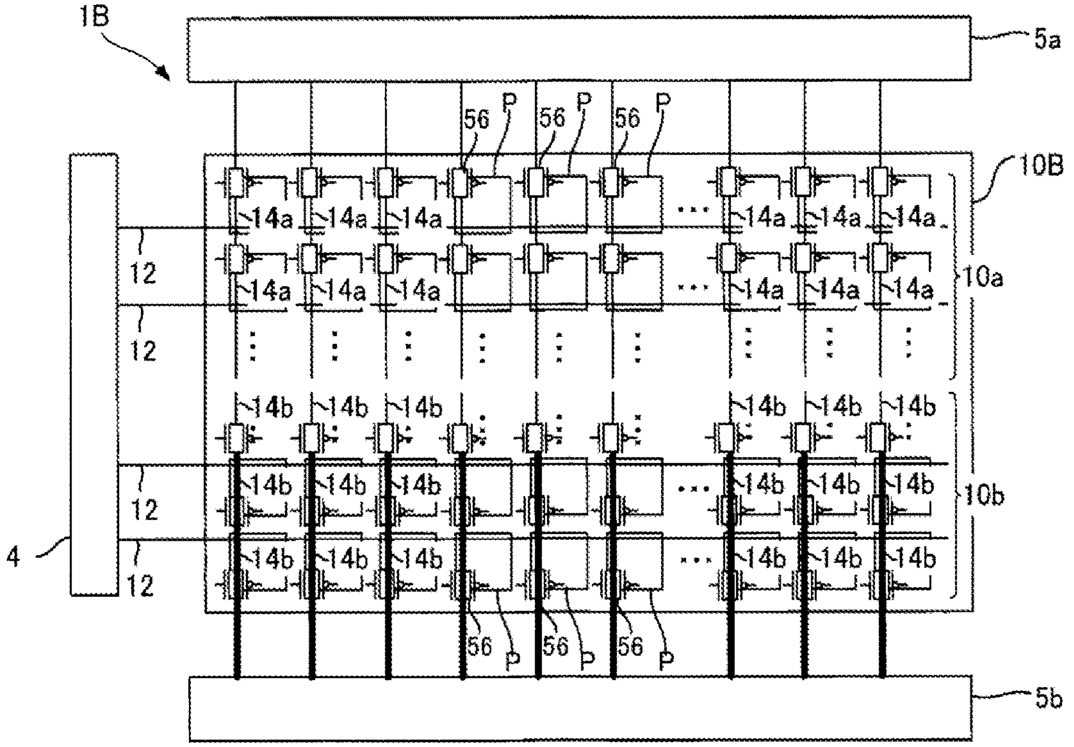
FIG. 22 is a diagram for explaining operation in the lower circuit illustrated in FIG. 17.
Figure 23:
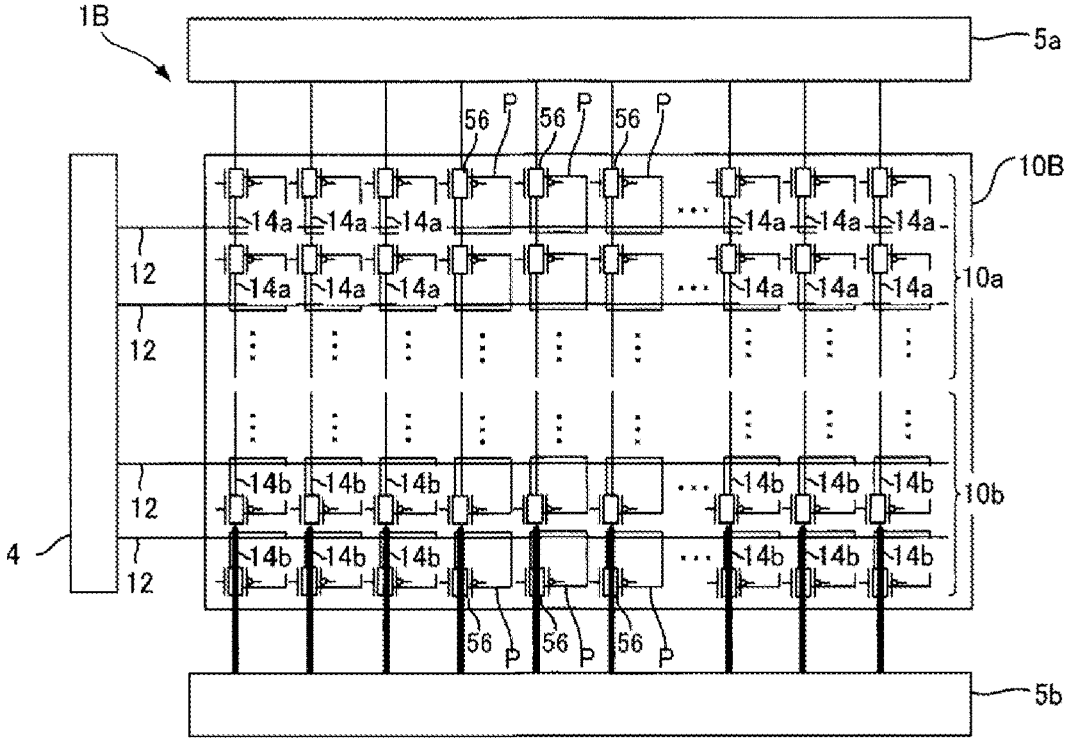
FIG. 23 is a diagram for explaining the operation in the lower circuit illustrated in FIG. 17.

FIG. 22 and FIG. 23 are each a diagram for explaining operation in the lower circuit 10*b* illustrated in FIG. 17. In the lower circuit 10*b*, the second switching elements 56*b* are sequentially set to off from a row in which data writing is completed. In the lower circuit 10*b*, the data writing processing is sequentially performed row by row from the top of the display unit 10 in a state where all the second switching elements 56 are set to on.

As illustrated in FIG. 22, for example, when writing is performed in the (m−1)-th row, the second switching elements 56*b* corresponding to the m-th row and the (m−1)-th row are set to on, and the other second switching elements 56*b* are set to off. In this state, the data writing processing is performed in the pixels P in the (m−1)-th row. In the data writing processing in the pixels P in the (m−1)-th row, since the second switching elements 56*b* corresponding to the (m−2)-th row are set to off, the data line 14*a* corresponding to the (m−1)-th row and the data line 14*a* corresponding to the (m−2)-th row are in the decoupled state. As illustrated in FIG. 23, when the data writing processing in the pixels P in the (m−1)-th row is completed, the second switching elements 56*b* corresponding to the pixels P in the (m−1)-th row are turned off, and the data writing processing in the pixels P in the m-th row is performed. In this way, the plurality of second switching elements 56*b* are sequentially set to on from the top.

As described above, in the lower circuit 10*b*, since the plurality of second switching elements 56*b* are provided for each row, the second switching elements 56*b* are set to off in order from the top. Therefore, an amount of charge and discharge of the retention capacitor 130*b* in the initialization period A decreases. Therefore, in the embodiment, it is possible to suppress an increase in power consumption due to the charge and discharge of the retention capacitor 130*b* compared to the first embodiment. Thus, power consumption can be reduced as compared to the first embodiment.

Also in the embodiment, since the switching element 55 is provided as in the first embodiment, it is possible to suppress an increase in power consumption due to charge and discharge of the parasitic capacitor of the wiring line 15 and the capacitance element 120.

D. Fourth Embodiment

A fourth embodiment will be described. Note that in each of the following examples, reference numerals used in the description of the first embodiment are used for elements having similar functions to those of the third embodiment, and each detailed description thereof will be appropriately omitted.

Figure 24:
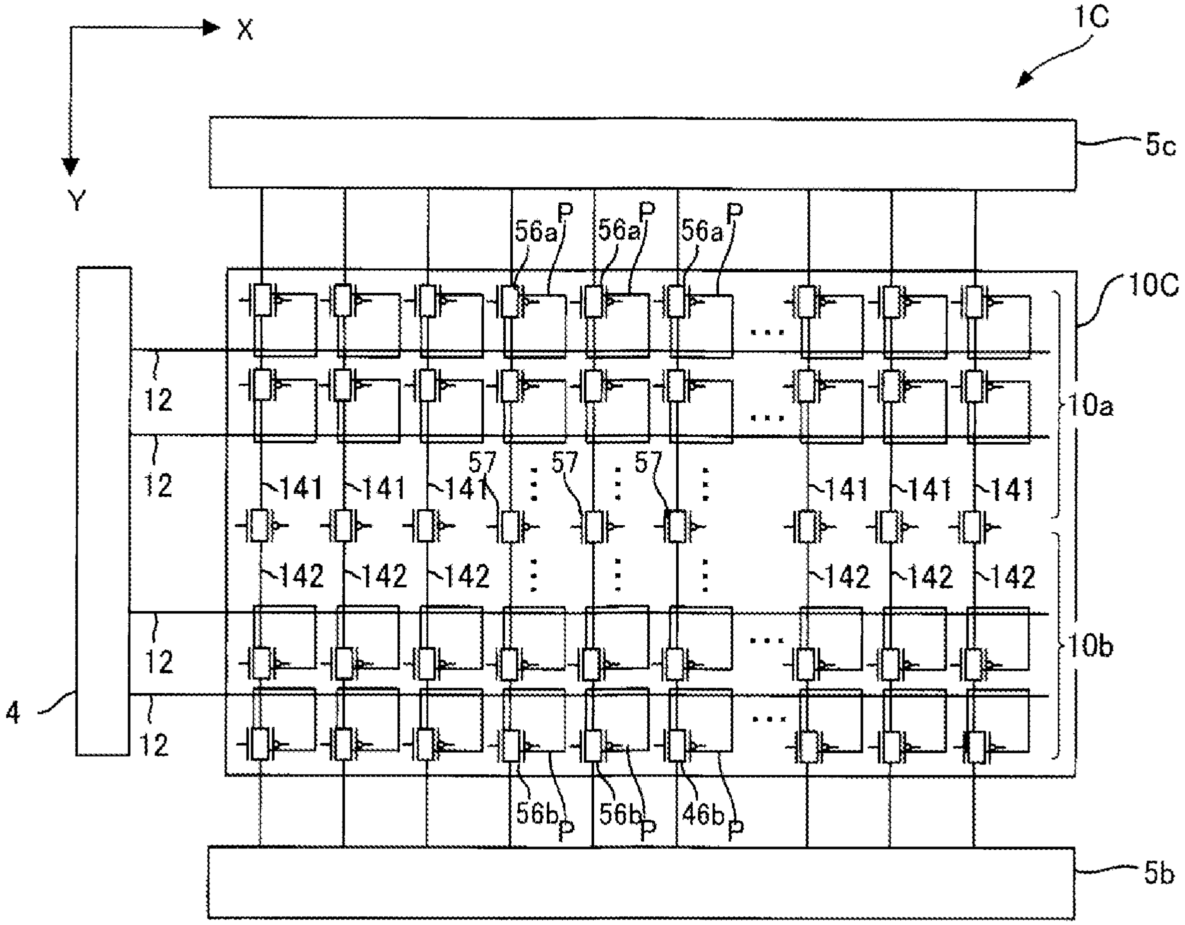
FIG. 24 is a block diagram illustrating the configuration of the display device of the third embodiment.

FIG. 24 is a block diagram illustrating a configuration of a display device 1C of the third embodiment. A display unit 10C of the display device 1C of the third embodiment is different from the display device 1 of the first embodiment in that a third switching element 57 is included between the upper circuit 10*a* and the lower circuit 10*b*. In addition, in a data line driving circuit 5*c* of the display device 1C, the auxiliary circuit 51, the demultiplexer DM and the data signal supplying circuit 50 are omitted.

As illustrated in FIG. 24, the third switching element 57 is provided between the first data line 141 and the second data line 142. The third switching element 57 controls coupling between the first data line 141 and the second data line 142. Further, the data line driving circuit 5*c* is electrically coupled to the second data line 142. Although not illustrated in detail, the data line driving circuit 5*c* includes the initialization circuit 52. However, in the data line driving circuit 5*c*, the auxiliary circuit 51, the demultiplexer DM, and the data signal supplying circuit 50 are omitted.

In the embodiment, a potential corresponding to the video signal Vd is supplied from the data line driving circuit 5*b* to the upper circuit 10*a* and the lower circuit 10*b*. The third switching element 57 is turned off at the time of initialization in the upper circuit 10*a*, and the third switching element 57 is turned on at the time of data writing. For this reason, it is possible to suppress an increase in power consumption due to charge and discharge of the retention capacitor 130 in the initialization period A, and it is possible to make a disposition space of the data line driving circuit 5*c* smaller than that of the data line driving circuit 5*b*.

Additionally, although not illustrated, in the embodiment as well, the display device 1C includes the switching element 55 as in the first embodiment. Thus, an increase in power consumption due to charge and discharge of the parasitic capacitor of the wiring line 15 and the capacitance element 120 can be suppressed.

E. Modified Example

For example, various modifications described below can be made to the above-described embodiments. Further, modified examples may be appropriately combined.

Figure 25:
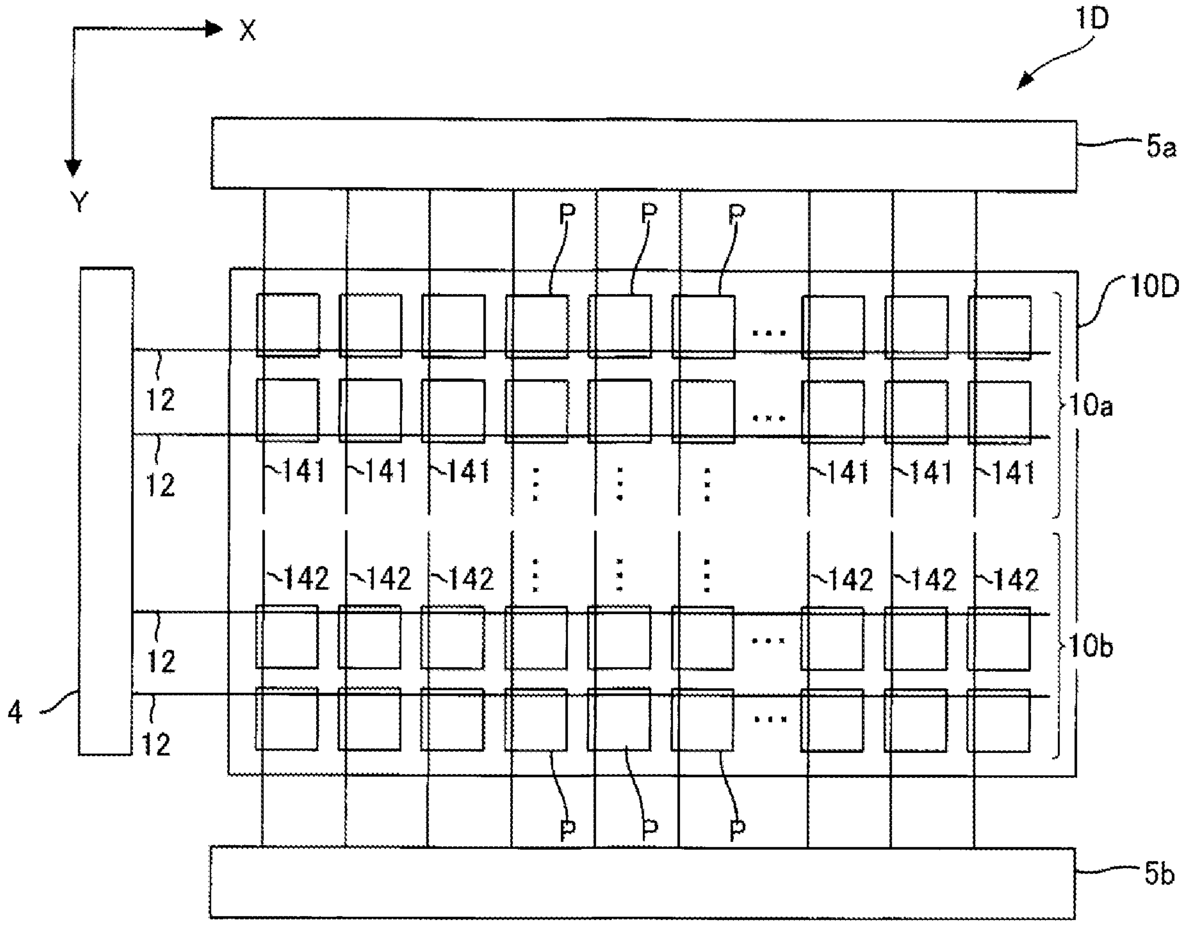
FIG. 25 is a block diagram illustrating a display device of a modified example.

FIG. 25 is a block diagram illustrating a display device 1D of a modified example. In the display device 1D illustrated in FIG. 25, the data line 14 is divided into the first data line 141 and the second data line 142. Further, the data line driving circuit 5*a* is coupled to the first data line 141, and the data line driving circuit 5*b* is coupled to the second data line 142. Since the data line 14 is divided into two, it is possible to suppress an increase in power consumption due to charge and discharge of the retention capacitor 130 compared to the first embodiment.

In the above-described embodiments, each of the light-emitting elements 150 is the OLED. However, for example, the "light-emitting element" may be an LED, a mini LED, a micro LED, or the like. LED is an abbreviation for light emitting diode.

F. Electronic Apparatus

The display devices 1, 1A, 1B, 1C and 1D of the respective embodiments and modified example described above are applicable to various electronic apparatuses. The display device 1 according to the embodiment described above is particularly suitable for an electronic apparatus required to display a high-definition image of 2K 2K or higher and required to be compact.

Figure 26:
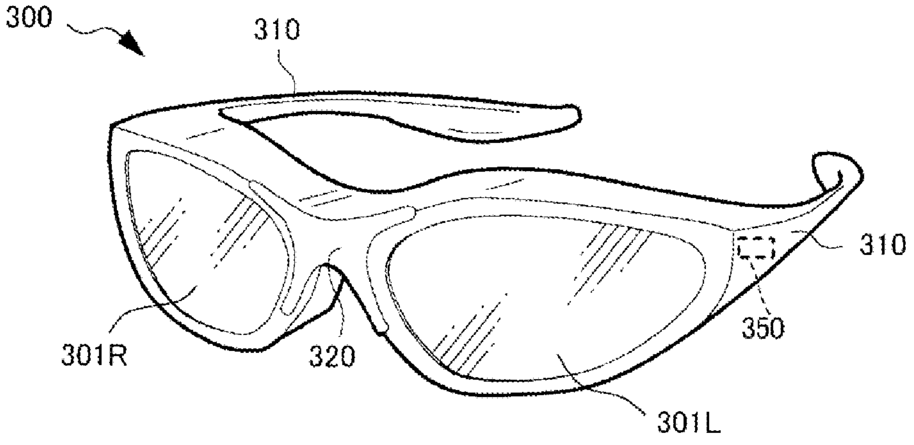
FIG. 26 is a perspective view illustrating an appearance of a head-mounted display as an electronic apparatus including a display device.
Figure 27:
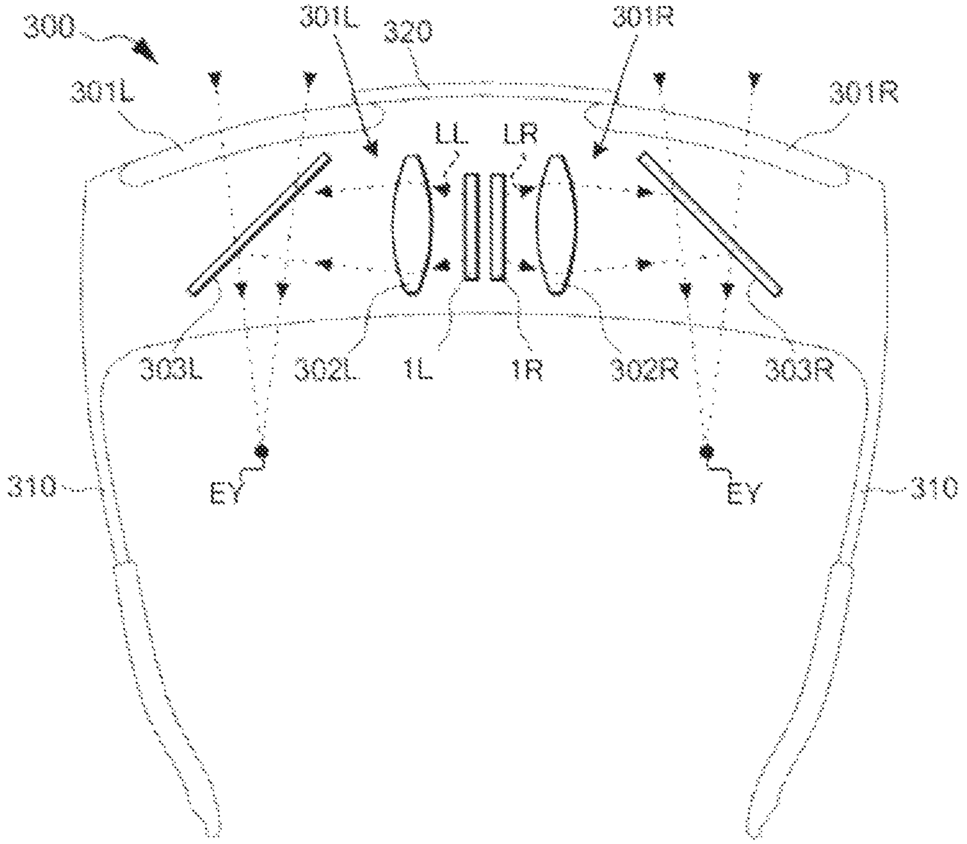
FIG. 27 is a diagram of an optical configuration of the head-mounted display illustrated in FIG. 26.

FIG. 26 is a perspective view illustrating an appearance of a head-mounted display 300 as an electronic apparatus. FIG. 27 is a diagram of an optical configuration of the head-mounted display 300 illustrated in FIG. 26. In FIG. 27, a left-eye display device 1 is denoted as a display device 1L, and a right-eye display device 1 is denoted as a display device 1R. Note that instead of the display device 1, the display device 1A, 1B, 1C or 1D may be used.

As illustrated in FIG. 26, the head-mounted display 300 includes a temple 310, a bridge 320, a projection optical system 301L, a projection optical system 301R and a control unit 350. Additionally, as illustrated in FIG. 27, the head-mounted display 300 includes two display devices 1. The control unit 350 includes, for example, a processor and a memory, and controls operation of each of the two display devices 1.

Image light LL formed by the display device 1L is emitted to the projection optical system 301L. The projection optical system 301L includes an optical lens 302L and a half mirror 303L. The image light LL is emitted toward the half mirror 303L via the optical lens 302L. A part of the image light LL is reflected by the half mirror 303L and is projected to a pupil EY of a wearer of the head-mounted display 300. Additionally, a part of the image light LL is transmitted through the half mirror 303L. Similarly, image light LR formed by the display device 1R is emitted to the projection optical system 301R. The projection optical system 301R includes an optical lens 302R and a half mirror 303R. The image light LR is emitted toward the half mirror 303L via the optical lens 302R. A part of the video light LR is reflected by the half mirror 303R and is projected onto the pupil EY of the wearer of the head-mounted display 300. Additionally, a part of the image light LR is transmitted through the half mirror 303R.

The wearer of the head-mounted display 300 can visually recognize an image formed by the image light LL and the image light LR while visually recognizing an external image.

The head-mounted display 300 includes the display device 1 and the control unit 350 described above. According to the display device 1, it is possible to suppress power consumption due to charge and discharge of various capacitors. Therefore, when the head-mounted display 300 includes the display device 1, it is possible to reduce power consumption of the head-mounted display 300.

Note that examples of the electronic apparatus to which the display device 1 described above is applied, in addition to the head-mounted display 300, include an electronic device disposed close to the eyes such as a digital scope, a digital binocular, a digital still camera, and a video camera. Further, the display device can be applied as a display unit provided in an electronic apparatus such as a mobile phone, a smart phone, a smart watch, a personal digital assistant (PDA), a car navigation device, and an automotive instrument panel. In addition, the display device 1 is applicable to a light valve of a projection projector.

The present disclosure has been described above based on the illustrated embodiments and modified example. However, the present disclosure is not limited thereto. In addition, the configuration of each component of the present disclosure may be replaced with any configuration that exerts the equivalent functions of the above-described embodiments, and to which any configuration may be added.

What is claimed is:

1. A display device, comprising:
- a light-emitting element;
- a data line;
- a wiring line;
- a first constant potential line to which a first constant potential is supplied;
- a first transistor configured to supply a drive current to the light-emitting element, the drive current corresponding to a video signal supplied via the wiring line and the data line;
- a second transistor configured to electrically couple the data line to the first constant potential line;
- a third transistor configured to control supply of the video signal to the wiring line and the data line;
- a capacitance element including a first electrode electrically coupled to the wiring line, and a second electrode disposed to face the first electrode, and electrically coupled to the third transistor; and
- a switching element configured to electrically couple the data line to the wiring line, the switching element being electrically coupled between the second transistor and the first electrode of the capacitance element.

2. The display device according to claim 1, further comprising:
- a second constant potential line to which a second constant potential is supplied; and
- a fourth transistor configured to electrically couple the first electrode to the second constant potential line.

3. The display device according to claim 1, further comprising:
- a third constant potential line to which a third constant potential is supplied; and
- a fifth transistor configured to electrically couple the second electrode to the third constant potential line.

4. The display device according to claim 1, further comprising a second switching element, wherein
- the data line is divided into a plurality of data lines, and each of the plurality of data lines is coupled to another data line via the second switching element.

5. The display device according to claim 1, wherein
- the data line is divided into a first data line and a second data line, and
- the display device further includes a third switching element that electrically couples the first data line to the second data line.

6. An electronic apparatus comprising:
- the display device according to claim 1; and
- a control unit configured to control operation of the display device.

* * * * *